United States Patent [19]
Modic

[11] Patent Number: 4,906,687
[45] Date of Patent: Mar. 6, 1990

[54] BLENDS OF POLAR THERMOPLASTIC POLYMERS AND MODIFIED BLOCK COPOLYMERS

[75] Inventor: Michael J. Modic, Houston, Tex.

[73] Assignee: Shell Oil Company, Houston, Tex.

[21] Appl. No.: 140,076

[22] Filed: Dec. 31, 1987

[51] Int. Cl.$^4$ .................... C08L 53/02; C08L 77/02
[52] U.S. Cl. ........................ 525/57; 525/92; 525/98
[58] Field of Search ............... 525/92, 366, 383, 386, 525/57, 98

[56] References Cited

U.S. PATENT DOCUMENTS

| | | | |
|---|---|---|---|
| Re. 27,145 | 6/1971 | Jones | 260/880 |
| 2,071,250 | 2/1937 | Carothers | 260/106 |
| 2,071,251 | 2/1937 | Carothers | 18/54 |
| 2,130,523 | 9/1938 | Carothers | 260/124 |
| 2,130,948 | 9/1938 | Carothers | 18/54 |
| 2,241,322 | 5/1941 | Hanford | 260/2 |
| 2,312,966 | 3/1943 | Hanford | 260/78 |
| 2,465,319 | 3/1949 | Whinfield et al. | 260/75 |
| 3,047,539 | 7/1962 | Pengilly | 260/75 |
| 3,113,986 | 12/1963 | Breslow et al. | 260/683.9 |
| 3,251,905 | 5/1966 | Zelinski | 260/879 |
| 3,259,607 | 7/1966 | Cherdron et al. | 260/78.3 |
| 3,265,765 | 8/1966 | Holden et al. | 260/876 |
| 3,299,171 | 1/1967 | Knobloch et al. | 260/857 |
| 3,390,207 | 6/1968 | Moss et al. | 260/879 |
| 3,393,210 | 7/1968 | Speck | 260/371 |
| 3,546,319 | 12/1970 | Prevorsek et al. | 260/857 |
| 3,579,489 | 5/1971 | Wagner | 260/78.3 |
| 3,598,887 | 8/1971 | Darcy et al. | 260/879 |
| 3,639,517 | 2/1972 | Kitchen et al. | 260/879 |
| 4,007,311 | 2/1977 | Harlan | 428/246 |
| 4,041,103 | 8/1977 | Davison et al. | 260/857 D |
| 4,080,357 | 3/1978 | Gergen et al. | 260/42.18 |
| 4,088,627 | 5/1978 | Gergen et al. | 260/42.18 |
| 4,096,204 | 6/1978 | Gergen et al. | 260/876 B |
| 4,101,605 | 7/1978 | Gergen et al. | 260/873 |
| 4,107,131 | 8/1978 | Gergen et al. | 260/40 TN |
| 4,172,859 | 10/1979 | Epstein | 428/401 |
| 4,174,358 | 11/1979 | Epstein | 525/183 |
| 4,208,356 | 6/1980 | Fukawa et al. | 525/89 |
| 4,219,627 | 8/1980 | Halasa et al. | 525/89 |
| 4,226,952 | 10/1980 | Halasa et al. | 525/192 |
| 4,242,470 | 12/1980 | Gergen et al. | 525/92 |
| 4,427,828 | 1/1984 | Hergenrother et al. | 525/66 |
| 4,429,076 | 1/1984 | Saito et al. | 525/57 |
| 4,578,429 | 3/1986 | Gergen et al. | 525/291 |
| 4,588,765 | 5/1986 | Beever | 525/140 |
| 4,628,072 | 12/1986 | Shiraki et al. | 525/57 |
| 4,657,970 | 4/1987 | Shiraki et al. | 525/92 |
| 4,657,971 | 4/1987 | Shiraki et al. | 525/57 |

FOREIGN PATENT DOCUMENTS

| | | |
|---|---|---|
| 0189672 | 7/1986 | European Pat. Off. ............ 525/366 |
| 3022258 | 1/1981 | Fed. Rep. of Germany . |
| 7138611 | 12/1967 | Japan . |
| 1305130 | 1/1973 | United Kingdom . |

*Primary Examiner*—Wilbert J. Briggs, Sr.

[57] ABSTRACT

A multiphase thermoplastic composition is provided by incorporating at least one polar thermoplastic polymer with at least one functionalized, selectively hydrogenated alkenyl arene/conjugated diene block copolymer to which has been grafted an effective amount of carboxyl functional groups primarily in the alkenyl arene blocks thereof. The carboxyl functional groups may be in the form of carboxylic acids, their salts and esters, and combinations thereof. The rubbery compositions of the present invention possess improved tensile strength, high temperature mechanical properties and oil resistance.

57 Claims, No Drawings

BLENDS OF POLAR THERMOPLASTIC POLYMERS AND MODIFIED BLOCK COPOLYMERS

CROSS-REFERENCE TO RELATED APPLICATIONS

This is related to copending U.S. patent applications Ser. Nos. 766,215 and 766,216, both filed Aug. 16, 1985.

FIELD OF THE INVENTION

The present invention relates to a multiphase polymeric composition. More particularly, it relates to a multiphase polymeric composition having improved tensile strength particularly at high temperatures and oil resistance comprising a polar thermoplastic polymer and a modified block copolymer. The copolymer is obtained by modifying a base block copolymer composed of a selectively hydrogenated conjugated diene polymer block and an alkenyl arene polymer block with a carboxyl containing functional group grafted primarily n the alkenyl arene block. These carboxyl groups may then be esterified or neutralized with a metal iron to vary the degree of mechanical property modification on the polymeric composition. The polar thermoplastic polymer contains at least one polar functional group which is capable of chemically linking to or capable of exhibiting a strong physical mutual action (strong interaction) with a carboxylic acid group and/or a group derived therefrom present in the modified block copolymer.

BACKGROUND OF THE INVENTION

It is known that a block copolymer can be obtained by an anionic copolymerization of a conjugated diene compound and an alkenyl arene compound by using an organic alkali metal initiator. Block copolymers have been produced which comprise primarily those having a general structure

A—B—A wherein the polymer blocks A comprise thermoplastic polymer blocks of alkenyl arenes such as polystyrene, while block B is a polymer block of a conjugated diene such as butadiene and isoprene. The proportion of the thermoplastic blocks to the elastomeric polymer block and the relative molecular weights of each of these blocks is balanced to obtain a rubber having unique performance characteristics. In such a rubber, the blocks A are thermodynamically incompatible with the blocks B resulting in a rubber consisting of two phases; a continuous elastomeric phase (blocks B) and a basically discontinuous hard, glass-like plastic phase (blocks A) called domains. These domains act as physical cross-links anchoring the ends of many block copolymer chains. Since the A—B—A block copolymers have two A blocks separated by a B block, domain formation results ineffectively locking the B blocks and their inherent entanglements in place by the A blocks and forming a network structure. Such a phenomena allows the A—B—A rubber to behave like a conventionally vulcanized rubber that contains dispersed reactive filler particles. These thermoplastic A—B—A rubbers are physically crosslinked by the domains in a network structure as opposed to being chemically crosslinked like a conventionally vulcanized rubber. As such, these polymers may be handled in thermoplastic forming equipment and are soluble in a variety of relatively low cost solvents. Additionally, polymers of this type are highly useful in that the vulcanization step is eliminated and, contrary to vulcanized scrap rubbers, the scrap from the processing of these thermoplastic elastomers can be recycled for further use.

These typed of block copolymers are diversified in characteristics, depending on the content of the alkenyl arene compound. When the content of the alkenyl arene compound is small, the produced block copolymer is a so-called thermoplastic rubber. It is a very useful polymer which shows rubber elasticity in the unvulcanized state and is applicable for various uses. For example, these polymers are applicable for uses such as moldings of shoe sole, etc.; impact modifier for polystyrene resins and engineering thermoplastics; in adhesive and binder formulations; modifiction of asphalt; etc.

Such block copolymers with a high alkenyl arene compound content, such as more than 70% by weight, provide a resin possessing both excellent impact resistance and transparency, and such a resin is widely used in the field of packaging. Many proposals have been made on processes for the preparation of these types of block copolymers (U.S. Pat. No. 3,639,517).

While in general these block copolymers have a number of outstanding technical advantages, one of their principal limitations lies in their sensitivity to oxidation. This behavior is due to the unsaturation present in the elastomeric section comprising the polymeric diene block. Oxidation may be minimized by selectively hydrogenating the copolymer in the diene block, for example, as disclosed in U.S. Pat. Re. 27,145. For example, prior to hydrogenation, the block copolymers have an A—B—A molecular structure wherein each of the A's is an alkenyl-arene polymer block and B is a conjugated diene polymer block, such as an isoprene polymer block or a butadiene polymer block which preferably contains 35–55 mole percent of the condensed butadiene units in a 1,2 configuration.

While these selectively hydrogenated block copolymers have vastly improved stability over their unsaturated precursors, they have certain shortcomings, which it would be desirable to eliminate or minimize. One such shortcoming is that these selectively hydrogenated block copolymers are deficient in many applications in which the retention of properties at elevated temperatures and deformation resistance are required. At relatively low temperatures, say room temperature, such block copolymers are known to have particularly high tensile strengths due to the formation of glassy phase arene block domains which act as physical crosslinks locking in the inherent entanglements within the rubbery B block matrix. The mechanical integrity of these domains and resulting network structure formed appear to control the tensile strengths of these copolymers. Moreover, at elevated temperatures, the mechanical integrity of block copolymers is limited to the integrity of the hard phase arene block domains. For example, network forming copolymers having arene blocks of polystyrene have poor mechanical properties at high temperature which may be attributed to the weakening of the polystyrene domains above its glass transition temperature (Tg) of 100° C. Improvements in the high temperature characteristics of the network forming block copolymers may be achieved by enhancing the integrity of the alkenyl arene domains to higher temperatures.

These selectively hydrogenated block copolymers are further deficient as a result of their poor processability. It is possible, of course, to improve processability by diluting the polymer with extending oils and the like. This normally results in a drastic reduction in other physical properties, particularly, heat resistance, tensile strength and properties associated therewith. Blends of these block copolymers with a second resin for processability improvement are known, but in most instances the second resin is a relatively nonpolar polymer.

The foregoing accents a further deficiency of these selectively hydrogentated block copolymers. In particular, these selectively hydrogenated block copolymers are deficient in many applications in which interactions are required between it and other materials. Applications in which improvements in adhesion characteristics may promote improved performance include (1) the toughening of, and dispersion in, polar polymers such as the engineering thermoplastics; (2) the adhesion to high energy substrates in a hydrogenated block copolymer elastomer based high temperature adhesive, sealant or coating materials; and (3) the use of hydrogenated elastomers in reinforced polymer systems. The placement of functional groups onto the block copolymer may provide interactions not possible with hydrocarbon polymers and, hence, may extend the range of applicability of this material.

Though highly polar polymers typically are not compatible with these block copolymers, many attempts have been made to blend them just the same. Blends of polystyrene/polybutadiene/polystyrene block copolymer (SBS) with nylon polymers have been disclosed in U.S. Pat. No. 3,546,319 (15% SBS rubber in polyamide), Belgium Pat. No. 70,498 (35% nylon in SBS), and Japan Pat. No. 7,138,611 (5 to 50% SBS in polyamide). Additionally, blends of a selectively hydrogenated block copolymer having at least two monoalkenyl arene blocks and at least one selectively hydrogenated conjugated diene block there between with, for example (1) nylon (polyamide) polymers have been disclosed in U.S. Pat. No. 4,041,103 (100 parts by weight of a block copolymer with 5 to 200 parts by weight of a polyamide) and 4,242,470 (100 parts by weight of a polyamide with less than 50 parts by weight of a block copolymer); (2) polyesters have been disclosed in U.S. Pat. No. 4,101,605; (3) polyurethanes have been disclosed in U.S. Pat. Nos. 4,088,627 and 4,107,131; and (4) halogenated thermoplastic polymers have been disclosed in U.S. Pat. No. 4,096,204. However, the poor compatibility of the block copolymer component or its selectively hydrogenated counterpart with the polar polymer is not satisfactorily overcome in such blends and results in heterogenous or non-adhering polymer mixtures with their associated defects.

As earlier noted, the placement of functional groups onto the block copolymer may provide sites for interactions with such polar resins and, hence may extend the range of applicability of this elastomer. Such interactions, which include chemical reaction, hydrogen bonding and dipole interactions, are a route to achieving improved interfacial adhesion, hence improved compatibility with polar thermoplastics.

Many attempts have been made to improve compatibility with polar thermoplastic polymers by adding low modulus modifiers which contain polar moieties as a result of polymerization or which have been modified to contain polar moieties by various grafting techniques. To this end, various compositions have been proposed utilizing such modifiers having carboxylic acid moieties and derivatives thereof, for example, Epstein in U.S. Pat. Nos. 4,174,358 (polyamides) and 4,172,859 (polyesters); Saito et al. in U.S. Pat. No. 4,429,076 and in German Offenlegunsschrift 3,022,258 (published Jan. 8, 1981); Hergenrother et al. in U.S. Pat. No. 4,427,828 (polyamides); Harlan in U.S. Pat. No. 4,007,311 (polyurethane); and Shiraki et al. in U.S. Pat. Nos. 4,628,072; 4,657,970; and 4,657,971.

Epstein dicloses a broad range of low modulus polyamide and polyester modifiers which have been prepared by free radical copolymerization of specific monomers with acid containing monomers (60 to 99% polyamide or polyester and correspondingly 40-1% w modifier). Alternatively, Epstein discloses the modification of polymers by grafting thereto specific carboxylic acid containing monomers. The grafting techniques allowed for therein are limited to thermal addition (ene reaction) and to nitrene insertion into C-H bonds or addition to C=C bonds (ethylenic unsaturation). Though Epstein does disclose a broad range of polyamide and polyester modifiers, Epstein does not disclose or suggest the utilization of hydrogenated copolymers of alkenyl arenes and conjugated dienes nor, more particularly, modified selectively hydrogenated copolymers of alkenyl arenes and conjugated dienes as polyamide modifiers.

Saito et al. ('076 and '258) disclose polar thermoplastic compositions which contain a modified unsaturated aromatic vinyl compound/conjugated diene block copolymer (1 to 99 parts by weight polyamide and correspondingly 99 to 1 parts by weight modified block copolymer). The unsaturated block copolymer has been modified by grafting a dicarboxylic acid group or derivative thereof (e.g. anhydride moieties) at a point of ethylenic unsaturation via thermal addition (ene reaction). However, such modifiers and compositions containing same are deficient in that the weatherability and resistance to thermal deterioration are poor; and, therefore, the polymers and compositions have been used only in the fields where such properties are not required. Furthermore,it is also noted that the ene reaction is a reversible reaction.

Harlan discloses polyurethane compositions which contain a modified monoalkenyl arene/conjugated diene block copolymer whch may be unsaturated or selectively hydrogentated (5 to 50% by weight block copolymer and correspondingly 95 to 50% by weight polyurethane cement adhesive.) The block copolymer therein has been modified by grafting a polymerized alkyl ester of an acid of the acrylic acid series (e.g., esters of methacrylic acid) in the presence of a free radical catalyst such as an organic peroxide.

Hergenrother et al. (polyamide) and Shiraki et al. (polar thermoplastic polymer) also describe a composition containing a block copolymer similar to that of Saito et al. However, in order to improve the weatherability and resistance to heat aging, both partially hydrogenate the block copolymer in their respective blends to an ethylenic unsaturation degree not exceeding 20 percent of the ethylenic unsaturation contained in the block copolymer prior to hydrogenation. Once the block copolymer is partially hydrogenated, the block copolymer is modified by grafting a molecular unit containing a carboxylic acid group and/or a group derived therefrom (e.g. anhydride moieties). Hergenrother et al. disclose grafting via thermal addition (ene reaction) utilizing the available residual unsaturation in the block copolymer. As such, Hergenrother et al. retained the deficiencies associated with the reversibility of the ene reaction. On the other hand, Shiraki et al. utilized free radical initiators to perform the grafting therein. Additionally, Hergenrother, et al. limit their disclosure to blends containing the polyamide as the major component, i.e., 50 to 99%, polyamide and correspondingly 50 to 1% modifier block copolymer.

As is readily apparent in each of the foregoing prior art polar thermoplstic polymer compositions utilizing a modified alkenyl arene/conjugated diene block copolymers, improved compatability with the particular polar thermoplastic polymer is achieved via specific interactions, between the modified diene block and the polar thermoplastic polymer.

On the other hand, Gergen et al., in the copending U.S. patent application Ser. No. 766,215 which issued on Nov. 11, 1988 as U.S. Pat. No. 4,783,503 and 766,216 which issued on Jan. 10, 1989 as U.S. Pat. No. 4,797,447 describe a polyamide and a polyester composition, respectively, containing a block copolymer which is a thermally stable, modified, selectively hydrogenated, high 1,2 content alkenyl arene/conjugated diene block copolymer grafted with at least one functional group utilizing the metalation process. Therein, the functional groups are grafted primarly in the alkenyl arene block, thereby avoiding any adverse effects associated with modifying the diene block. In this composition, interactions between the polar thermoplastic polymer and rubber are achieved via the alkenyl arene block. The compositions therein and resinous in nature, i.e., 50-97% w polymide or polyester and correspondingly 50-3% w modifier block copolymer.

Further research and experimentation on polar thermosplastic polymer compositions containing the modified block coolymers utilized in Gergen et al. in copending U.S. patent applications Ser. Nos. 766,215 which issued on Nov. 11, 1988 as U. S. Pat. No. 4,783,503 (K-4669) and 766,216 which issued on Jan. 10, 1989 as U.S. Pat. No. 4,797,447 K-4801) have yielded unexpected and significant improvements in tensile strength (particularly at high temperatures) and oil resistance. These new polar thermoplastic polymer blend compositions contain block copolymers having the carboxyl functional groups present in their acid, ester and/or neutralized metal carboxylate salt forms. In particular, the improvement is believed to increase as the proportion of carboxyl functional groups in their acid form increases. Whether either or both of these forms in combination produce optimum performance may be dependent on the particular polar thermoplastic polymer selected. Furthermore, the tensile strength and high temperature properties ar also improved by increasing the degree of carboxyl functionality.

To those skilled in the art, the degree to which the grafting reaction and/or strong physical mutual interaction phase size reduction occur, thereby promoting interfacial adhesion, together with the distribution of the polar thermoplastic polymer within the blend typically contribute to the tensile strength of the blend. The results herein demonstrate that functionalizing the alkenyl arene segment promotes covalent bonding between the modified block copolymer and the polyamide. Furthermore, the polar thermoplastic polymer also becomes well distributed in the block copolymer phase.

SUMMARY OF THE INVENTION

According to the present invention, there is provided a multiphase thermoplastic composition comprising a polar thermoplastic polymer and a modified alkenyl arene/conjugated diene block copolymer wherein an effective amount of carboxyl functional groups for imparting improved tensile strength, high temperature mechanical properties, and oil resistance to the multiphase thermoplastic composition are grafted to the block copolymer primarily in the alkenyl arene block. It has been surprisingly found that the existence of the carboxylic acid and carboxylate ester and/or salt (neutralized, e.g. —COOLi) forms of the carboxyl functional groups either singly or in combination produces significant improvements in the tensile strength, high temperature mechanical properties and oil resistance of the overal blend.

More particularly, there is provided a multiphase thermoplastic composition comprising:
(a) one phase containing at least one polar thermoplastic polymer each containing at least one polar functional group; and
(b) at least one other phase containing at least one functionalized, selectively hydrogenated block copolymer to which has been grafted on the average an effective amount of carboxyl functional groups for imparting improved tensile strength, high temperature mechanical properties and oil resistance to said multiphase thermoplastic composition, said functionalized block copolymer comprising
   (1) a base block copolymer which comprises
      (i) at least one polymer block A, said A block being predominantly a polymerized alkenyl arene block, and
      (ii) at least one selectively hydrogenated polymer block B, said B block prior to hydrogenation being predominantly a polymerized conjugated diene block,
   (2) wherein substantially all of said carboxyl functional groups are grafted to said base block copolymer on said A blocks,
(c) said one phase (a) being present in a weight ratio of about 1:99 up to less than about 50:50 preferably about 5:95 to about 45:55 and more preferably from about 20:80 to about 40:60, relative to said at least one other phase (b) and
(d) said polar thermoplstic polymer excluding said functionalized block copolymer.

These carboxyl functional groups may be in the form of carboxylic acids, their salts and esters.

The polar thermoplastic polymers are those which contain at least one polar functional group capable of chemically linking to (e.g., grafting reaction) or capable of exhibiting a strong physical mutual interaction (including ionic interactions) with a carboxylic acid group and/or a group derived therefrom present in the functionalized block copolymer. As preferred examples of the functional group, there can be mentioned an amino group, a hydroxyl group, a thiol group, a carboxyl group, an isocyanate group, an epoxy group, a halogen group and groups derived thereform, such as a urethane group, an ester group, an amide group, an ammonium salt group and a metal carboxylate group. The polar thermoplastic polymers herein preferably contain at least one functional group selected from the foregoing groups. These functional groups may be bonded to either the terminals, the side chains or backbone of the polymers. As preferred examples of the polar thermoplastic polymer containing such polar functional group(s), there can be mentioned polyamides, thermoplastic polyesters, thermoplastic polyurethanes, vinyl alcohol polymers, vinyl ester polymers, ionomers and halogenated thermoplastics.

The functionalized block copolymer is preferably characterized as having been prepared by the process which comprises metalating the base block copolymer, and reacting the resulting metalated base block copolymer with effective amounts of at least one graftable electrophilic molecule containing at least one of said carboxyl functional groups or with effective amounts of an electrophile, wherein the electrophile is carbon dioxide, thereby preparing the functionalized block copolymer.

Furthermore, the functionalized block copolymer may be linear or branched, with the term "branched" also including symmetric or asymmetric radial and star structures.

The effective amount of carboxyl functional groups for imparting improved tensile strength, high temperature mechanical properties and oil resistance to the composition is on the average at least about one (1), preferably at least about ten (10), carboxyl functional groups per molecule of the block copolymer. It is presently believed that the addition of about one (1) carboxyl functional group per aromatic ring of the A blocks is limiting. Preferably, each of these carboxyl functional groups may be either in the carboxylic acid or ester form or ionized by neutralization with metal ions having a positive ionized valence state. Thus, from 100 percent to 0 percent of the carboxyl functional groups may be in the acid form (—COOH); and, correspondingly, from 0 percent to 100 percent of the carboxyl functioinal group may be in the ester and/or salt form (neutralized, e.g. —COOLi). The metal ions may be selected from the group consisting of uncomplexed and complexed metal ions. Preferably, the metal ions have a positive ionizxed valence state of from one to three inclusive.

Preferably, there is provided the multiphase thermoplastic composition as defined above, wherein (a) each of the A blocks prior to hydrogenation is predominantly a polymerized monoalkenyl monocyclic arene block having an average molecular weight of about 1,000 to about 125,000, preferably about 1,000 to about 60,000, (b) each of the B blocks prior to hydrogenation is predominantly a polymerized conjugated diene block having an average molecular weight of about 10,000 to about 450,000, preferably about 10,000 to about 150,000, (c) the A blocks constitute between about 1 and about 99, preferably between about 2 and about 60, and more preferably between about 2 and 40, percent by weight of the copolymer, (d) the unsaturation of the B blocks is less than about 10 percent, preferably less than about 5 percent and more preferably at most 2 percent, of the original unsaturation of the B blocks, (e) the unsaturation of the A blocks is greater than about 50 percent, preferably greater than about 90 percent, of the original unsaturation of the A blocks, and (f) the carboxyl functional group is preferably present on the average from about ten (10) of said carboxyl functional groups per molecule of said copolymer to about one (1) of said carboxyl functional groups per aromatic ring of said A block and more preferably on the average from about (10) of said carboxyl functional groups per molecule of said copolymer to about one (1) of said carboxyl functional groups per every two (2) aromatic rings of said A block and yet more preferably on the average from about ten (10) of said carboxyl functional groups per molecule of said copolymer to about one (1) of said carboxyl functional groups per every ten (10) aromatic rings of said A blocks.

A feature of this invention lies in providing polymeric compositions which are processable in the melt and/or in solution and have improved tensile strength, high temperature mechanical properties and oil resistance.

Accordingly, those and other features and advantages of the present invention will become apparent from the following detailed description.

DETAILED DESCRIPTION OF THE INVENTION

The polar thermoplastic polymers are those which contain at least one polar functional group capable of chemically linking to (e.g., grafting reaction) or capable of exhibiting a strong physical mutual interaction (including ionic interactions) with a carboxylic acid group and/or a group derived therefrom present in the functionalized block copolymer. As preferred examples of the functional group, there can be mentioned an amino group, a hydroxyl group, a thiol group, a carboxyl group, an isocyanate group, an epoxy group, a halogen group and groups derived therefrom, such as a urethane group, an ester group, an amide group, an ammonium salt group and a metal carboxylate group. The polar thermoplsstic polymers herein preferably contain at least one functional group selected from the foregoing groups. These functional groups may be bonded to either the terminals, the side chains or backbone of the polymers. As preferred examples of the polar thermoplastic polymer containing such polar functional group(s), there can be mentioned polyamides, thermoplastic polyesters, thermoplastic polyurethanes, vinyl alcohol polymers, vinyl ester polymers, ionomers and halogenated thermoplastics. Such polar thermoplastic polymers are disclosed in U.S. Pat. Nos. 4,080,357; 4,429,076; 4,628,072; 4,657,970; and 4,657,971, the disclosures of which are herein incorporated by reference. Furthermore, it is to be noted that polar thermoplastic polymers having more than one functional group capable of chemically linking or very strongly interacting with the carboxyl functional groups on the functionalized block copolymer may result in cross-linking the composition to varying degrees. Such a phenomena may be advantageously utilized or not depending on the specific utility or application of the composition.

For illustrative purposes, the following detailed descriptions of polyamides and thermoplastic polyesters are included herein.

Polyamides

By polyamide is meant a condensation product which contains recurring aromatic and/or aliphatic amide groups as integral parts of the main polymer chain, such products being known generically as "nylons." The polyamide matrix of the compositions of this invention is well known in the art and embraces those semi-crystalline and amorphous resins having a molecular weight of at least 5000 having a linear or branched structure. Preferably, these polyamides have molecular weights of from about 5,000 to about 50,000. Furthermore, the polyamides are preferably linear with a melting point in excess of 200° C. These polyamides may be $\alpha$-polyamides, $\alpha\omega$-polyamides, and mixture and/or copolymers of these, preferably $\alpha$-polyamides.

By "α-polyamides" is meant those polyamides having only one terminal group which is reactive with the carboxyl functional groups of the block copolymer utilized in the compositions herein, such as an amine group. Examples of such α-polyamides are those polyamides that may be obtained by polymerizing a monoaminocarboxylic acid or an internal lactam thereof having at least two carbon atoms between the amino and carboxylic acid groups thereof. Suitable polyamides include those described in U.S. Pat. Nos. 2,071,250; 2,071,251; 2,241,322; and 2,312,966, the disclosures of which are herein incorporated by reference.

As examples of the said monoaminocarboxylic acids or lactams thereof there may be mentioned those compounds containing from 2 to 16 carbon atoms between the amino and carboxylic acid groups, said carbon atoms forming a ring with the —CO—NH— group in the case of a lactam. As particular examples of aminocarboxylic acids and lactams there may be mentioned ε-aminocaproic acid, butyrolactam, pivalolactam, caprolactam, capryllactam, enantholactam, undecanolactam, dodecanolactam and 3- and 4-amino benzoic acids.

Illustrative examples of α-polyamides which may be incorporated in the thermoplastic polymer blends of the invention include:
polypyrrolidone (nylon 4)
polycaprolactam (nylon 6)
polyheptolactam (nylon 7)
polycapryllactam (nylon 8)
polynonanolactam (nylon 9)
polyundecanolactam (nylon 11)
polydodecanolactam (nylon 12)

It is also possible to use in this invention polyamides prepared by the copolymerization of two or more of the above polymers or terpolymerization of the above polymers or their components.

Preferred α-polymides include 6; 11; and 12.

A feature of this invention lies in providing polymeric composition which are processable in solution and/or in the melt; and have improved mechanical properties, such as impact resistance.

By "α,ω-polyamides" is meant those polyamides having at least two terminal groups, e.g. on each end of a linear polyamide, which are reactive with the carboxyl functional groups of the block copolymer utilized in the compositions herein. Preferably, these terminal groups are amines. Examples of such α-ω-polyamides are those polyamides that may be obtained by polymerizing a diamine which contains at least two carbon atoms between the amino groups thereof and a dicarboxylic acid or ester thereof. Suitable α-ω-polyamides include those described in U.S. Pat. Nos. 2,071,250; 2,071,251; 2,130,523; 2,130,948; and 3,393,210, the disclosures of which are herein incorporated by reference.

Typically, these polyamides are prepared by polymerizing substantially equimolar proportions of the diamine and the dicarboxylic acid. Furthermore, excess diamine may be employed to provide an excess of amine end groups over carboxyl end groups in the polyamide.

The term "substantially equimolecular proportions" (of the diamine and of the dicarboxylic acid) is used to cover both strict equimolecular proportions and the slight departures therefrom which are involved in conventional techniques for stabilizing the viscosity of the resultant polyamides.

Examples of the said diamines are diamines of the general formula $H_2N(CH_2)_nNH_2$ wherein n in an integer of from 2 to 16, such as trimethylenediamine, tetramethylenediamine, pentamethyldiamoine, octamethylenediamine, decamethylenediamine, dodecamethylenediamine, hexadecamethylenediamine, and especially hexamethylenediamine.

C-alkylated diamines, e.g. α,2-dimethylpentamethylenediamine and 2,2,4- and 2,4,4-trimethylhexamethylenediamine are further examples. Other diamines which may be mentioned as examples are aromatic diamines, e.g. p-phenylenediamine, 4,4'-diaminodiphenyl sulphone, 4,4'-diaminodiphenyl ether and 4,4'-diaminodiphenyl sulphone, 4,4'-diaminodiphenyl ether and 4,4'-diaminodiphenylmethane; and cycloaliphatic diamines, for example diaminodicyclohexylmethane.

The said dicarboxylic acids may be aromatic, for example isophthalic and terephthalic acids. Preferred dicarboxylic acids are of the formula HOOC—Y—COOH wherein Y represents a divalent aliphatic radical containing at least 2 carbon atoms, and examples of such acids ae sebacic acid, octadecanedioic acid, suberic acid, azelaic acid, undecanedioic acid, glutaric acid, pimelic acid, and especially adipic acid. Oxalic acid is also a preferred acid. Furthermore, the dicarboxylic acid may be used in the form of a functional derivative thereof, for example an ester.

Illustrative examples of α,ω-polyamides which corporated in the thermoplastic polymer blends of the invention include:
polyhexamethylene adipamide (nylon 6:6)
polyhexamethylene azelaiamide (nylon 6:9)
polyhexamethylene sebacamide (nylon 6:10)
polyhexamethylene isophthalamide (nylon 6:iP)
polyamide of hexamethylenediamine and n-dodecanedioic acid (nylon 6:12)
polyamide of dodecamethylenediamine and n-dodecanedioic acid (nylon 12:12).

It is also possible to use in this invention polyamides prepared by the copolymerization of two or more of the above polymers or terpolymerization of the above polymers or their components.

Also useful is nylon produced by Dynamit Nobel, which is the product of the dimethyl ester of terephthalic acid and a mixture of isomeric trimethyl hexamethylenediamine.

Preferred α-polyamides include 6,6,; 6,3; and 6,12.

Polyesters

The thermoplastic polyesters employed in the present invention include polyesters having a recurring ester linkage in the molecule, for example, polyactones, and polyesters having a structure formed by polycondensation of a dicarboxylic acid with a glycol, for example, polyalkylene arylates. The polyesters have a generally crystalline structure with a melting point over 120° C. or are generally amorphous with a glass transition temperature above 25° C., and are thermoplastic as opposed to thermosetting. The number average molecular weight of the polyesters is generally between 5000 to 100,000 and preferably 10,000 to 50,000.

One particularly useful group of polyesters are those thermoplastic polyesters having a structure formed by polycondensation of a dicarboxylic acid with a glycol. These polyesters may be prepared according to methods well known in the art such as by direct esterification or ester exchange reaction of a dicarboxylic acid or the lower alkyl ester, acid halide, or anhydride derivatives thereof with a glycol.

Among the dicarboxylic acids suitable for preparing polyesters useful in the present invention are those having from 2 to about 25 carbon atoms inclusive, preferably of up to 15 carbon atoms inclusive. The dicarboxylic acids may be aliphatic containing hydrocarbyl groups such alkylene, alkylidene, cycloalkylene, and cycloalkylidene. The hydrocarbyl groups may contain unsaturation as in carbon-carbon multible bonds and may be substituted such as an arylaliphatic containing an aryl substituent on an otherwise aliphatic molecule. Examples of suitable aliphatic decarboxylic acids are oxalic acid, malonic acid, succinic acid, glutaric acid, adipic acid, suberic acid, azelaic acid and sebacic acid. The dicarboxylic acids may also be aromatic having at least one aromatic ring, preferably up to two aromatic rings, and the aromatic rings may contain hydrocarbyl substituents. Where the aromatic dicarboxylic acid contains more than one aromatic ring, the rings may be connected by carbon-carbon bonds, by hydrocarbyl bridging groups such as alkylene or alkylidene groups, or by other bridging groups such as oxo, thio and sulfone. Examples of suitable aromatic dicarboxylic acids are terephthalic acid, isophthalic acid, orthophthalic acid, 1,5-naphthalenic dicarboxylic acid, 2,5-naphthalenic dicarboxylic acid, 2,6-naphthalenic dicarboxylic acid, 2,7-naphthalenic dicarboxylic acid, 4,4'biphenyldicarboxylic acid, 4,4'dicarboxydiphenylsulfone, 4,4'dicarboxydiphenylmethane, 4,4'-dicarboxydiphenylpropane, and 4,4'-dicarboxydiphenyloctane. Also suitable for use in the invention are dicarboxylic acids having both an aliphatic carboxyic acid moiety and an aromatic carboxylic acid moiety wherein the two acid moieties are connected by carbon-carbon bonds, by hydrocarbyl bridging groups such as alkylene or alkylidene groups, or by other bridging groups such as an oxo group. Examples of such suitable dicarboxylic acids are 4-carboxyphenylacetic acid, 4-carboxyphenoxyacetic acid, 4-carboxyphenoxypropionic acid, 4-carboxyphenoxybutyric acid, 4-carboxyphenoxyvaleric acid, 4-carboxyphenoxyhexoanoic acid and β-(2-alkyl-4-carboxyphenoxy)propionic acids. Mixtures of dicarboxylic acids can also be employed. Terephthalic acid is particularly preferred.

The glycols suitable for preparing the polyesters useful in the present invention include polyhydric alcohols of 2 to about 12 carbon atoms, preferably dihydric alcohols (diols) such as alkylene glycols and aromatic glycols and dihydroxy ethers. Examples of suitable alkylene glycols such as ethylene glycol, 1,3-propylene glycol 1,4-butylene glycol, 1,6-hexylene glycol, 2-methyl-1,3-propanedial, 1,10-decamethylene glycol, and 1,12-dodecamethylene glycol. Other suitable alkylene glycols are alicyclic diols such as 1,4-cyclohexane dimethanol. Aromatic glycols can be substituted in whole or in part. Suitable aromatic glycols include aromatic dihydroxy compounds such as p-xylylene glycol, pyrocatechol, resorcinol, hydroquinone, and alkyl-substituted derivatives of these compounds. Suitable dihydroxy ethers include diethylene glycol and triethylene glycol. Preferred glycols are the straight chain alkylene glycols, more preferred are the straight chain alkylene glycols having 2 to 4 carbon atoms.

A preferred group of these polyesters are the poly(alkylene arylates), in particular the poly(alkylene terephthalates) such as the crystalline copolymers poly(ethylene terephthalate), poly(propylene tyerephthalate) and poly(butylene terephthalate).

Poly(alkylene terephthalates), an alkylene glycol, may be formed by the polycondensation of an alkylene glycol and dimethylterephthalate or terephthalic acid.

When straight-chained alkylene glycols are utilized, the poly(alkylene terephthalates) have the generalized formula:

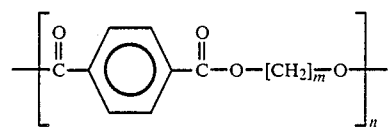

where m is the number of carbon atoms in the straight-chained alkylene glycol utilized an n varies from 70 to 280. For example, ethylene glycol (m=2) is utilized in forming poly(ethylene terephthalate); 1,3-propylene glycol (m=3) is utilized in forming poly(propylene terephthalate); and 1,4-butylene glycol (m=4) is utilized in forming poly(butylene terephthalate). The molecular weight of these poly(alkylene terephthalates) typically varies from about 20,000 to about 20,000 to about 50,000. A suitable process for manufacturing these polymers is disclosed in U.S. Pat. No. 2,465,319 and in British Pat. No. 1,305,130, which are incorporated herein by reference.

Commercially available poly(ethylene terephthalate) and poly(butylene terephthalate) are available from General Electric (GE) under the tradename VALOX® thermoplastic polyester. Other commercial polymers include CELANEX® from Celanese, TENITE® from Eastman Kodak, and VITUF® (PBT) and CLEARTUF® (PET) from Goodyear Chemical.

Another commercially available and suitable polyester is ARDEL® polyarylate available from Amoco, having repeating units of the formulae

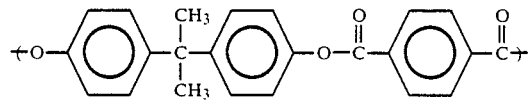

and

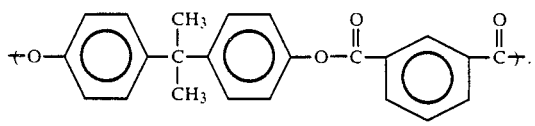

Another valuable group of thermoplastic polyesters which may be used in the present invention are polylactones. Polylactones have recurring ester structural units such as those obtained by ring opening polymerization of a cyclic lactone. Examples of suitable polylactones are poly(pivalolactone), poly(β-propiolactone) and poly(ε-caprolactone).

Polypivalolactone is a linear polymer having recurring ester structural units mainly of the formula:

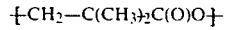

i.e., units derived from pivalolactone. Preferably the polyester is a pivalolactone homopolymer. Also included, however, are the copolymers of pivalolactone with not more than 50 mole percent, preferably not more than 10 mole percent of other beta-propiolactones, such as beta-propiolactone; alpha, alpha-diethyl-beta-propiolactones; and alpha-methyl-alpha-ethyl-beta-propiolactone. The term "beta-propiolactones"

refers to beta-propiolactone (2-oxetanone) and to derivatives thereof which carry no substituents at the beta-carbon atom of the lactone ring. Preferred beta-propiolactones are those containing a tertiary or quaternary carbon atom in the alpha position relative to the carbonyl group. Especially preferred are the alpha,alpha-dialkyl-beta-propiolactones wherein each of the alkyl groups independently has from one to four carbon atoms. Examples of useful monomers are:
alpha-ethyl-alpha-methyl-beta-propiolactone,
alpha-methyl-alpha-isopropyl-beta-propiolactone,
alpha-ethyl-alpha-n-butyl-beta-propiolactone,
alpha-chloromethyl-alpha-methyl-beta-propiolactone,
alpha, alpha-bis(chloromethyl)-beta-propiolactone, and alpha, alpha-dimethyl-beta-propiolactone, (pivalolactone.

See generally U.S. Pat. Nos. 3,259,607; 3,299,171; and 3,579,489 which are incorporated herein by reference. These polypivalolactones have a molecular weight in excess of 20,000 and a melting point in excess of 120° C.

Another useful polyester which may be obtained from a cyclic lactone is polyprolactone. Typical poly(ε-caprolactones) are substantially linear polymers in which the repeating unit is

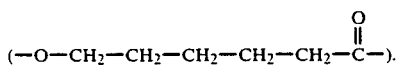

These polymers have similar properties to the polypivolalactones and may be prepared by a similar polymerization mechanism. See generally U.S. Pat. No. 3,259,607.

Other useful polyesters include the cellulosics. The thermoplastic cellulosic esters employed herein are widely used as molding, coating and film-forming materials and are well known. These materials include the solid thermoplastic forms of cellulose nitrate, cellulose acetate (e.g. cellulose diacetate, cellulose triacetate), cellulose butyrate, cellulose acetate butyrate, cellulose propionate, cellulose tridecanoate, carboxymethyl cellulose, ethyl cellulose, hydroxyethyl cellulose and acetylated hydroxyethyl cellulose as described on pages 25-28 of Modern Plastics Encyclopedia, 1971-72, and references listed therein.

Linear and branched polyesters and copolyesters of glycols and terephthalic or isophthalic acid have been commercially available for a number of years and have been described in U.S. Pat. Nos. 2,465,319 and 3,047,539.

The amount of polar thermoplastic polymer included in the compositions of the invention may vary widely depending upon the properties desired in the composition. For example, as little as 1 percent by weight of the composition may be composed of the polar thermoplastic polymer. Preferably, the amounts of the polar thermoplastic polymer included in the composition may range from 1 to less than about 50 percent by weight based on total weight of the composition. More preferably, the amounts of the polar thermoplastic polymer amount being from about 50 to about 45 percent by weight with a particularly preferred amount being from about 20 to about 40 percent by weight, as these amounts appear to impart excellent tensile strength and high temperature mechanical properties plus oil resistance to the finished composition.

Selectively Hydrogenated Block Copolymer Base Polymer

The selectively hydrogenated block copolymers employed in the present invention may have a variety of geometrical structures, since the invention does not depend on any specific geometrical structure, but rather upon the chemical constitution of each of the polymer blocks, and subsequent modification of the block copolymer. The precursor of the block copolymers employed in the present composition are preferably thermoplastic elastomers and have at least one alkenyl arene polymer block A and at least one elastomeric conjugated diene polymer block B. The number of blocks in the block copolymer is not of special importance and the macromolecular configuration may be linear or branched, which includes graft, radial or star configurations, depending upon the method by which the block copolymer is formed.

Typical examples of the various structures of the precursor block copolymers used in the present invention are represented as follow:

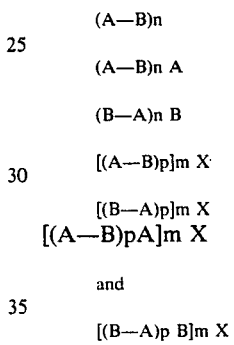

wherein A is a polymer block of an alkenyl arene, B is a polymer block of a conjugated diene, X is a residual group of a polyfunctional coupling agent having two or more functional groups, n and p are, independently, integers of 1 to 20 and m is an integer of 2 to 20. Furthermore, the above-mentioned branched configurations may be either symmetrical or asymmetrical with respect to the blocks radiating from X.

It will be understood that both blocks A and B may be either homopolymer, random or tapered copolymer blocks as long as each block predominates in at least one class of the monomers characterizing the blocks defined hereinbefore. For example, blocks A may comprise styrene/alpha-methylstyrene copolymer blocks or styrene/butadiene random or tapered copolymer blocks as long as the blocks individually predominate in alkenyl arenes. The A blocks are preferably monoalkenyl arene. The term "monoalkenyl arene" will be taken to include particularly those of the benzene series such as styrene and its analogs and homologs including o-methylstyrene, p-methylstyrene, p-tert-butylstyrene, 1,3-dimethylstyrene, alpha-methylstyrene and other ring alkylated styrenes, particularly ring-methylated styrenes, and other monoalkenyl polycyclic aromatic compounds such as vinyl naphthalene, vinyl anthracene and the like. The preferred monoalkenyl arenes are monovinyl monocyclic arenes such as styrene and alpha-methylstyrene, and styrene is particularly preferred.

The blocks B may comprise homopolymers of conjugated diene monomers, copolymers of two or more conjugated dienes, and copolymers of one of the dienes with a monoalkenyl arene as long as the blocks B predominate in conjugated diene units. The conjugated dienes are preferably ones containing from 4 to 8 carbon atoms. Examples of such suitable conjugated diene monomers include: 1,3-butadiene (butadiene), 2-methyl-1,3-butadiene (isoprene), 2,3-dimethyl-1,3-butadiene, 1,3-pentadiene (piperylene), 1,3-hexadiene, and the like. Mixtures of such conjugated dienes may also be used. The preferred conjugated dienes are butadiene and isoprene.

Preferably, the block copolymers of conjugated dienes and alkenyl arene hydrocarbons which may be utilized include any of those which exhibit elastomeric properties; and those butadiene derived elastomers which have 1,2-microstructure contents prior to hydrogenation of from about 7 to about 100 percent, preferably from about 25 to about 65 percent, more preferably from about 35 to about 55 percent. Such block copolymers may contain various ratios of conjugated dienes to alkenyl arenes. The proportion of the alkenyl arene blocks is between about 1 and about 99 percent by weight of the multiblock copolymer, preferably between about 2 and about 60 percent, more preferably between about 2 and about 55 percent by weight and particularly preferable between about 2 and about 40 percent by weight. When the alkenyl arene content is not more than about 60 percent by weight, preferably not more than about 55 percent by weight, the precursor block copolymer has characteristics as a thermoplastic elastomer; and when the alkenyl arene content is greater than about 60 percent by weight, preferably more than about 70 percent by weight, the precursor block copolymer has characteristics as a resinous polymer.

The average molecular weights of the individual blocks may vary within certain limits. In most instances, the monoalkenyl arene blocks will have average molecular weights in the order of about 1,000 to about 125,000, preferably about 1,000 to about 60,000, while the conjugated diene blocks either before or after hydrogenation will have average molecular weights in the order of about 10,000 to about 450,000, preferably about 10,000 to about 150,000. The total average molecular weight of the multiblock copolymer is typically in the order of about 12,000 to about 700,000, preferably from about 12,000 to about 270,000. These molecular weights are most accurately determined by gel permeation chromatography.

The block copolymers may be produced by any well known block polymerization or copolymerization procedures including the well known sequential addition of monomer techniques, incremental addition of monomer technique or coupling technique as illustrated in, for example, U.S. Pat. Nos. 3,251,905; 3,390,207; 3,598,887 and 4,219,627, the disclosures of which are incorporated herein by reference. As is well known in the block copolymer art, tapered copolymer blocks can be incorporated in the multiblock copolymer by copolymerizing a mixture of conjugated diene and alkenyl arene monomers utilizing the difference in their copolymerization reactivity rates. Various patents describe the preparation of multiblock copolymers containing tapered copolymer blocks including U.S. Pat. Nos. 3,251,905; 3,265,765; 3,639,521 and 4,208,356, the disclosures of which are incorporated herein by reference.

It should be observed that the above-described polymers and copolymers may, if desired, be readily prepared by the methods set forth above. However, since many of these polymers and copolymers are commercially available, it is usually preferred to employ the commercially available polymer as this serves to reduce the number of processing steps involved in the overall process.

These polymers and copolymers are preferably hydrogenated to increase their thermal stability and resistance to oxidation. The hydrogenation of these polymers and copolymers may be carried out by a variety of well established processes including hydrogeation in the presence of such catalysts as Raney Nickel, noble metals such as platinum, palladium and the like, and soluble transition metal catalysts. Suitable hydrogenation processes which can be used are ones wherein the diene-containing polymer or copolymer is dissolved in an inert hydrocarbon diluent such as cyclohexane and hydrogenated by reaction with hydrogen in the presence of a soluble hydrogenation catalyst. Such processes are disclosed in U.S. Pat. Nos. 3,113,986 and 4,226,952, the disclosures of which are incorporated herein by reference. The polymers and copolymers are hydrogenated in such a manner as to produce hydrogenated polymers and copolymers having a residual ethylenic unsaturation content in the polydiene block of not more than about 20 percent, preferably not more than about 10 percent, most preferably not more than about 5 percent, of their original ethylenic unsaturation content prior to hydrogenation.

Modified Block Copolymers

The modified block copolymers according to the present invention are preferably grafted or substituted in the alkenyl arene block by the metalation process as later described herein. Exemplary reactions are given below, utilizing an exemplary styrene unit from a polystyrene segment of a suitable block copolymer:

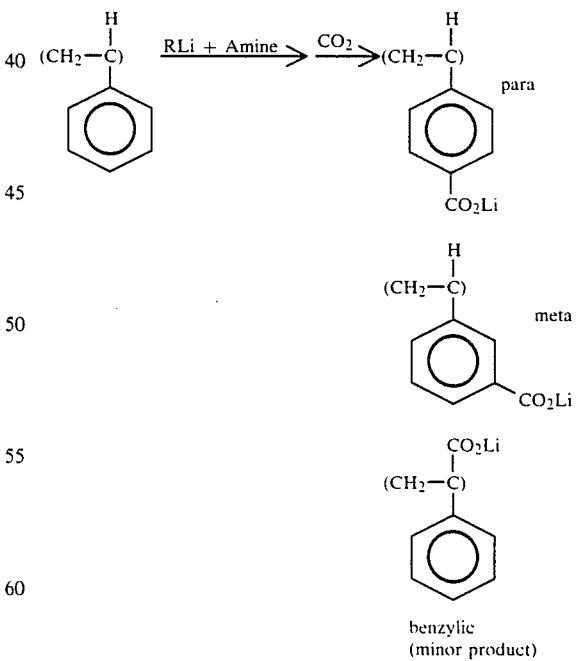

Where: RLi = Alkyl Lithium

The structure of the substituted block copolymer specifically determined by locating the functionality on the alkenyl arene block gives the block copolymer a substantially greater degree of thermal stability.

Graftable Compounds

In general, any materials having the ability to react with the metalated base polymer ar operable for the purposes of this invention.

In order to incorporate functional groups into the metalated base polymer, electrophiles capable of reacting with the metalated base polymer are necessary. Reactants may be polymerizable or nonpolymerizable; however, preferred electrophiles are nonpolymerizable when reacted with metalated polymers such as those utilized herein.

The class of preferred electrophiles which will form graft polymers within the scope of the present invention include reactants from the following groups carbon dioxide, ethylene oxide, aldehydes, ketones, carboxylic acid derivatives such as their salts, esters and halides, epoxides, sulfur, boron alkoxides, isocyanates and various silicon compounds.

These electrophiles may contain appended functional groups as in the case of N,N-dimethyl-p-aminobenzaldehyde where the amine is an appended functional group and the aldehyde is the reactive electrophile. Alternatively, the electrophile may react to become the functional site itself; as an example, carbon dioxide (electrophile) reacts with the metalated polymer to form a carboxyl functional group. By these routes, polymers could be prepared containing grafted sites selected from one or more of the following groups of functionality type carboxylic acids, their salts and esters, ketones, alcohols and alkoxides, amines, amides, thiols, borates, anhydrides, and functional groups containing a silicon atom.

These functionalities can be subsequently reacted with other modifying materials to ultimately produce carboxyl functional groups appended thereon which are necessary for the impact modification effect observed and relied upon herein. In some cases, the reaction could take place simultaneously with the grafting process but in most examples it would be practiced in subsequent post modification reaction. The grafted carboxyl functional groups may be present as carboxylic acids, their salts and esters, and combinations thereof. Additionally, carboxyl functional groups in any of these forms may be further reacted with other modifying materials to convert from one form to another, thereby varying the relative porportions of each of these carboxylate forms to the others. For example, grafted carboxylic acid groups could be suitably modified by esterifying same by appropriate reaction with hydroxy-containing compounds of varying carbon atom lengths.

The effective amounts of carboxyl functional groups for imparting improved tensile strength, high temperature mechanical properties and oil resistance to the composition is on the average at least about one (1), preferably at least about ten (10), carboxyl functional groups per molecule of the block copolymer. It is presently believed that the addition of about one (1) electrophile per aromatic ring of the A blocks is limiting. Thus, is carbon dioxide is used as the electrophile, this translates to about one (1) carboxyl group per aromatic ring. Therefore, the effective amount of carboxyl functional groups corresponds to from about an average of one carboxyl functional group per molecule of the block copolymer to about an average of one carboxyl functional group per aromatic ring of the A block, respectively. Preferably, the functionality level is on the average from about ten carboxyl functional groups per molecule of the copolymer to about one carboxyl functional group per aromatic ring of the A block, and, more preferably, on the average from about ten carboxyl functional groups per molecule of the copolymer to about one carboxyl functional group per every two aromatic rings of the A block; and, yet more preferably, on the average from about ten carboxyl functional groups per molecule of the copolymer to about one carboxyl functional group per every ten aromatic rings of the A block. As previously noted, it is currently believed that the average of one addition per aromatic ring is limiting. However, it is believed that the greater the degree of functionality (carboxyl group content) attained, the greater the improvement in these properties.

Neutralization of Modified Block Copolymer

The carboxylic acid groups in the modified block copolymers of the present invention may then by "neutralized" by reacting the polymer with an ionizable metal compound to obtain a metal salt. The degree of improvement in mechanical properties resulting from the blend of the polar thermoplastic polymer and the carboxylated block copolymer may be greatly influenced by the specific polar thermoplastic polymer utilized, by the degree of carboxyl functionalization in the block copolymer, and by the degree of neutralization thereof.

The metal ions which are suitable in forming the neutralized block copolymers of the present invention are mono-, di and trivalent ions of metals in Groups IA, IB, IIA, IIB, IIIA, IIIB, IV and VIII, of the Periodic Table of Elements. These metal ions can be used alone or in any mixture thereof. Suitable monovalent metal ions are $Na^+$, $K^+$, $Li^+$, $Cs^+$, $Ag^+$, $Hg^+$ and $Cu^+$. Suitable divalent metal ions are $Mg^{+2}$, $Ca^{+2}$, $Sr^{+2}$, $Ba^{+2}$, $Cu^{+2}$, $Cd^{+2}$, $Hg^{+2}$, $Sn^{+2}$, $Pb^{+2}$, $Fe^{+2}$, $Co^{+2}$, $Ni^{+2}$ and $Zn^{+2}$. Suitable trivalent metal ions are $Al^{+3}$, $Sc^{+3}$, $Fe^{+3}$, $La^{+3}$ and $Y^{+3}$. Preferable metal containing compounds for neutralization of the carboxylated block copolymers herein are hydroxides, oxides, alcoholates, carboxylates, formates, acetates, methoxides, ethoxides, nitrites, carbonates and bicarbonates of the above-referenced metal ions.

The degree of carboxyl functionality and of neutralization may be measured by several techniques. For example, infrared analysis may be employed to determine the overall degree of functionality calculated from the changes resulting in the absorption bands associated with —COOH units. Additionally, the titration of a solution of the block copolymer with a strong base may be utilized to determine the degree of functionality and/or degree of neutralization (metal carboxylate salt content.) Neutralization as used herein is based on the percentage of carboxylate ions (—$COO^-$) as compared to the total carboxyl group functionality, i.e., carboxylic acid plus the carboxylate ions.

In general, it was found that the added metal ion reacts approximately stoichiometrically with the carboxyl functional groups (acid form) in the polymer up to about 80 percent neutralization. Thereafter, excess quantities of the metal compound are necessary to carry the neutralization to completion.

Thus, each of these carboxyl functional groups may be either in the carboxylic acid or ester form or ionized by neutralization with metal ions having a positive ionized valence state. For example, from 100 percent to 0 percent of the carboxyl functional groups may be in the acid form (—COOH); and, correspondingly, from 0 percent to 100 percent of the carboxyl functional groups may be in the salt form (neutralized, e.g. —COOLi).

Preparation of the Modified Block Copolymers

The polymers may be prepared by any convenient manner. Preferably, the polymer is prepared such that the functional groups are incorporated into the block copolymer primarily on the aromatic portion of the alkenyl arene block via metalation.

Metalation may be carried out by means of a complex formed by the combination of a lithium component which can be represented by $R'(Li)_x$ with a polar metalation promoter. The polar compound and the lithium component can be added separately or can be premixed or pre-reacted to form an adduct prior to addition to the solution of the hydrogenated copolymer. In the compounds represented by $R'(Li)_x$, the $R'$ is usually a saturated hydrocarbon radical of any length whatsoever, but ordinarily containing up to 20 carbon atoms, and may also be a saturated cyclic hydrocarbon radical of e.g. 5 to 7 carbon atoms. In the formula $R'(Li)_x$, x is an integer of 1 to 3. Representative species include, for example: methyllithium, isopropyllithium, sec-butyllithium, n-butyllithium, t-butyllithium, n-dodecyllithium, 1,4-dilithiobutane, 1,3,5-trilithiopentane, and the like. The lithium alkyls must be more basic than the product, metalated polymer alkyl. Of course, other alkali metal or alkaline earth metal alkyls may also be used; however, the lithium alkyls are presently preferred due to their ready commercial availability. In a similar way, metal hydrides may also be employed as the metalation reagent but the hydrides have only limited solubility in the appropriate solvents. Therefore, the metal alkyls are preferred for their greater solubility which makes them easier to process.

Lithium compounds alone usually metalate copolymers containing aromatic and olefinic functional groups with considerable difficulty and under high temperatures which may tend to degrade the copolymer. However, in the presence of tertiary diamines and bridgehead monoamines, metalation proceeds rapidly and smoothly.

Generally, the lithium metalates the position allylic to the double bonds in an unsaturated polymer. In the metalation of polymers in which there are both olefinic and aromatic groups, the metalation will occur in the position in which metalation occurs most readily, as in positions (1) allylic to the double bond (2) at a carbon to which an aromatic is attached, (3) on an aromatic group, or (4) in more than one of these positions. In the metalation of saturated polymers having aromatic groups as is preferably the case herein, the metalation will occur primarily on an aromatic group and as a minor product at a carbon to which an aromatic is attached. In any event, it has been shown that a very large number of lithium atoms are positioned variously along the polymer chain, attached to internal carbon atoms away from the polymer terminal carbon atoms, either along the backbone of the polymer or on groups pendant therefrom, or both, in a manner depending upon the distribution of reactive or lithiatable positions. This distinguishes the lithiated copolymer from simple terminally reactive polymers prepared by using a lithium or even a polylithium initiator in polymerization thus limiting the number and the location of the positions available for subsequent attachment. With the metalation procedure described herein, the extent of the lithiation will depend upon the amount of metalating agent used and/or the groups available for metalation. The use of a more basic lithium alkyl such as tert-butyllithium alkyl may not require the use of a polar metalation promoter.

The polar compound promoters include a variety of tertiary amines, bridgehead amines, ethers, and metal alkoxides.

The tertiary amines useful in the metalation step have three saturated aliphatic hydrocarbon groups attached to each nitrogen and include, for example:

(a) Chelating tertiary diamines, preferably those of the formula $R_2N{-}(CH_2{-})_yNR_2$ in which each R can be the same or different, straight- or branched-chain alkyl group of any chain length containing up to 20 carbon atoms, or more, all of which are included herein and y can be any whole number from 2 to 10, and particularly the ethylene diamines in which all alkyl substituents are the same. These include, for example: tetramethylethylenediamine, tetraethylethylenediamine, tetradecylenediamine, tetraoctylhexylenediamine, tetra-(mixed alkyl) ethylene diamines, and the like.

(b) Cyclic diamines canbe used, such as, for example, the N,N,N',N'-tetraalkyl 1,2-diamino cyclohexanes, the N,N,N',N'-tetraalkyl 1,4-diamino cyclohexanes, N,N'-dimethylpiperazine, and the like.

(c) The useful bridgehead diamines include, for example, sparteine, triethylenediamine and the like.

Tertiary monoamines such as triethylamine are generally not as effective in the lithiation reaction. However, bridgehead monoamines such as 1-azabicyclo[2.2.2] octane and its substituted homologs are effective.

Ethers and the alkali metal alkoxides are presently less preferred than the chelating amines as activators for the metalation reaction due to somewhat lower levels of incorporation of functional group containing compounds onto the copolymer backbone in the subsequent grafting reaction.

In general, it is most desirable to carry out the lithiation reaction in an inert solvent such as saturated hydrocarbons. Aromatic solvents such as benzene are lithiatable and may interfere with the desired lithiation of the hydrogenated copolymer. The solvent/copolymer weight ratio which is convenient generally is in the range of about 5:1 to about 20:1. Solvents such as chlorinated hydrocarbons, ketones, and alcohols, should not be used because they destroy the lithiating compound.

Polar metalation promotors may be present in an amount sufficient to enable metalation to occur, e.g. amounts between about 0.01 and about 100 or more preferably between about 0.1 to about 10 equivalents per equivalent of lithium alkyl.

The equivalents of lithium employed for the desired amount of lithiation generally range from such as about 0.001 to about 3.0 per alkenyl arene hydrocarbon unit in the copolymer, presently preferably about 0.01 to about 1.0 equivalents per alkenyl arene hydrocarbon unit in the copolymer to be modified. The molar ratio of active lithium to the polar promoter can vary from such as about 0.01 to about 10.0. A preferred ratio is about 0.5 to about 2.0.

The amount of lithium alkyl employed can be expressed in terms of the lithium alkyl to alkenyl arene hydrocarbon molar ratio. This ratio may range from a value of 1 (one lithium alkyl per alkenyl arene hydrocarbon unit) to as low as $1 \times 10^{-3}$ (1 lithium alkyl per 1000 alkyenyl arene hydrocarbon units).

The process of lithiation can be carried out at temperatures in the range of such as about −70° C. to about +150° C., presently preferably in the range of about 25° C. to about 75° C., the upper temperatures being limited by the thermal stability of the lithium compounds. The lower temperatures are limited by considerations of production cost, the rate of reaction becoming unreasonably slow at low temperatures. The length of time necessary to complete the lithiation and subsequent reactions is largely dependent upon mixing conditions and temperature. Generally, the time can range from a few seconds to about 72 hours, presently preferably from about 1 minute to about 1 hour.

Grafting Step

The next step in the process of preparing the modified block copolymer is the treatment of the lithiated hydrogenated copolymer, in solution, without quenching in any manner which would destroy the lithium sites, with a species capable of reacting with a lithium anion. These species are selected from the class of molecules called electrophiles and must contain functional groups capable of undergoing nucleophilic attack by a lithium anion. As such, the modified block copolymer herein is the reaction product of an electrophile with an activated base (unmodified hydrogenated) block copolymer primarily at lithium anion sites on the aromatic substrates thereof, as opposed to the reaction product of an electrophile (strong Lewis base) with an unactivated base block copolymer on the aromatic substrates thereof.

Such species will react to give polymer bound functional groups including but not limited to:

| | | | |
|---|---|---|---|
| $-\overset{O}{\overset{\|}{C}}-O^-$ | carboxyl | $-\overset{}{C}-NR_2$ | Amine |
| $-C-OH$ | hydroxyl | $-\overset{O}{\overset{\|}{C}}-NR_2$ | Amide |
| $-C-OR$ | ether | $-SH$ | Thiol |
| $-\overset{O}{\overset{\|}{C}}-R$ | ketone | $-B(OR)_2$ | Borane Containing |
| $-\overset{O}{\overset{\|}{C}}-H$ | aldehyde | $\begin{array}{c}R_1\\ \|\\ -Si-R_2\\ \|\\ R_3\end{array}$ | Silicon Containing |

If necessary, the process also includes further chemistry on the modified block copolymer to carboxylate same. The resulting carboxyl functional groups may then be easily converted from or to a carboxylic acid form or a neutralized metal carboxylate salt form. Whether the acid, ester and/or neutralized form is preferable to produce the greatest improvement in tensile strength, high temperature mechanical properties and/or oil resistance may be dependent upon the polar thermoplastic polymer chosen for the blend. A simple tensile strength toughness test (ASTM-D-412) on a test specimen (bar) molded from such blends is clearly indicative and within the skills possessed by one of ordinary skill in the art.

The desired degree of neutralization may be achieved by various methods. If the modified block copolymer is in an all acid form or in a partially neutralized form and additional neutralization is desired, neutralization is preferably carried out under conditions which allow for a homogeneous uniform distribution of the metal containing compound in the modified block copolymer. No particular reaction conditions are essential except that the conditions should preferably permit the removal of the neutralization product. More specifically, the neutralization reaction is preferably carried either (1) by adding the metal containing compound, directly or in solution, to a solution of the modified block copolymer and then, on neutralization, precipitating and separating the resulting polymer; or (2) by melt blending the block copolymer with the metal containing compound. The melt blending is preferably conducted at elevated temperatures to facilitate homogeneous distribution of the metal containing compound and to volatilize the neutralization product.

Alternatively, if the modified block copolymer is in an all neutralized salt form or in a partially neutralized form and additional acidification (i.e., reverse-neutralization) is desired, acidification is likewise preferably carried out under conditions which allow for a homogeneous uniform distribution of the acid in the modified block copolymer. The acid utilized is preferably an organic acid, for example acetic acid or citric acid. The resulting metal-salt acidification product may or may not be harmful to the resulting modified block copolymer or blend incorporating same. In any event, the metal salt may be removed by conventional means if so desired.

As an additional alternative, the all acid and the all neutralized salt forms of the block copolymer may be blended with each other or together with the desired polyamide or polyamides by either the solution or melt blending method mentioned above, to achieve the desired degree of neutralization. It is to be understood, however, that the specific technique employed is not critical as long as it meets the requirements set forth above. The extent of the neutralization i.e., the degree to which the metal ion is linked with the carboxylate ion may be readily analyzed by titration methods.

It is not essential that the metal containing compound be added as such, but it is possible to form the metal containing compound in situ from components which react with each other in the desired manner in the polymer environment. Thus, it is possible to add a metal oxide to the all acid or partially neutralized block copolymer then add an acid such as acetic acid in the proper proportion and form the metal containing compound, i.e., the metal acetate, while the polymer is milled. The metal containing compound then neutralizes the block copolymer to the desired degree depending on the proportion of metal containing compound form.

Preparation of the Final Compositions

The multiphase thermoplastic polymer compositions of the present invention can be readily prepared by using any conventional mixing apparatus which is normally used for mixing or blending of polymer substances. Examples of such apparatus are single or multiple screw extruders, mixing rollers, Brabender, Banbury mills, kneaders and the like. Alternatively, the blends may be made by coprecipitation from solution, blending or by dry mixing together of the components, followed by melt fabrication of the dry mixture by extrusion.

The blends of the present invention may be prepared by melt-blending the desired proportion of modified block copolymer, ranging from about 1 percent to less than about 50 percent, with the desired proportion of the polar thermoplastic polymer, ranging from about 99 percent to greater than about 50 percent. The proportion of modified blank copolymer preferably ranges from about 5 percent to about 45 percent, or most preferably ranges from about 20 percent to about 40 percent, with the polar thermoplastic polymer making up the difference in the modified block copolymer/polar thermoplastic polymer blend.

The tensile strength and high temperature mechanical properties of the blends of this invention are improved over the polar thermoplastic polymer (e.g., polyamide) in a blend with the base (unmodified hydrogenated) copolymer or with a diene block modified selectively hydrogenated block copolymer. The amount of functionality and the quantity of ions employed in the composition will differ with the degree of property modification desired. The degree of esterification or neutralization effective in imparting improved tensile strength, high temperature mechanical properties and oil resistance to the blend is believed to range from about 0 to about 100 percent of the carboxyl groups in the modified block copolymer.

The mechanism of adhesion and the role of the copoymer/polar polymer interface to promote the distribution of the polar polymer is not entirely understood. However, it appears that the grafting reaction and/or strong interaction and the phase size of the polar polymer are interrelated. To some extent, enhancing the extent of reaction on interaction appears to facilitate the distributioin of the polar polymer within the block copolymer. Moreover, it appears that buy increasing the block copolymer/polar polymer interface more sites are made available for the unknown mechanism herein to operate upon.

There appears to be ionic crosslinking occurring within the alkenyl arene block domains. The reaction mechanism involved in the formation of the ionic alkenyl arene block domains and the exact structure of these ionic clusters within the respective domain is also not completely understood at the present time.

The polymer compositions of the present invention can further contain other conventional additives. Examples of such additives are reinforcing materials such as silica, carbon black, clay, glass fibers, organic fibers, calcium carbonate and the like, as well as stabilizers and inhibitors of oxidative, thermal, and ultraviolet light degradation, lubricants and mold release agents, colorants including dyes and pigments, nucleating agents, fire retardants, plasticizers, etc.

The stabilizers can be incorporated into the composition at any stage in the preparation of the thermoplastic composition. Preferably, the stabilizers are included early to preclude the initiation of degradation before the composition can be protected. Such stabilizers must be compatible with the composition.

In the following Examples, film casts from solution of the block copolymer of the present invention were tested using the following test procedures in the dry-as-cast state. With respect to the blend compositions, the test specimens were injection molded and tested using the following test procedures in the dry-as-molded state.

Tensile Strength and Elongation at Break: ASTM-D412 using a shortened "D" dumbell die (L=1.6 cm [cast specimens] and 2.5 cm [molded specimens] as opposed to 3.3 cm). Test specimens (cast and molded) were about 0.05 inches in thickness. A crosshead speed of 1 inch per minute was used during testing operations. The effective gauge length (i.e., the separation distance between the clamps) was 1.625 inches (40.625 mm) and 1.0 inch, respectively. Samples were evaluated on an Instron 1123 testing machine.

Glass Transition Temperature (Tg): Dynamic mechanical analysis utilizing Rheovibron Dynamic Viscoelastometer.

Furthermore, compression molded plaques of the block copolymer and blends of the present invention were tested using the following test procedures in the dry-as-molded state.

Compression Set: ASTM-D-395, Method B

Properties represent an average of at least five test specimens.

EXAMPLES

Having thus broadly described the present invention, it is believed that the same will become even more apparent by reference to the following examples. It will be appreciated, however, that the examples are presented solely for the purposes of illustration and should not be construed as limiting the invention. Furthermore, it is to be understood that in the tables that follow where reference is made to "counterion" only the metal counterion will be listed with respect to the partially neutralized modified block copolymers with the hydrogen counterion relating to the remaining acid functionality being implied.

The base (unmodified) block copolymers used were the polystyrene-poly(ethylene/butylene)-polystyrene (S-E/B-S) block copolymers shown in Table 1. The base block copolymers were the products of selectively hydrogenating a polystyrene-polybutadiene-polystyrene (S-B-S) block copolymer effected by use of a catalyst comprising the reaction products of an aluminum alkyl compound with nickel carboxylates. The base block copolymers have a residual ethylenic unsaturation of less than about 2% of the original unsaturation in the polybutadiene block and have a residual aromatic unsaturation of greater than 95% of the orginal unsaturation in the polystyrene block.

TABLE 1

| Base Block Copolymer | Styrene Content (wt. %) | Block Styrene Content (wt. %) | Total Mw. | Polymer Structure and Block Mw |
|---|---|---|---|---|
| A | 30 | 30 | 51,500 | 7,700-36,100-7,700 (S-EB-S) |
| B | 28 | 28 | 70,000 | 10,000-50,000-10,000 (S-EB-S) |

Remarks:
S-Polymer block composed chiefly of styrene.
EB-Polymer block composed chiefly of hydrogenated polybutadiene and referred to as ethylene/butylene.
Mw-Weight average molecular weight.

Per the following examples, the base block copolymer was first modified to varying degrees of carboxyl group functionality (content) by grafting carboxyl groups onto the polystyrene blocks via the metalation process described herein. The modified block copolymers were then further modified with lithium, sodium, magnesium and zinc metals to form carboxylate salts at various acid to carboxylate salt contents (degree of neutralization). Films were then cast from a solution of 10% w solids in tetrahydrofuran (THF) for dynamic mechanical analysis and tensile strength measurements. Compression/deformation analysis were perfromed on molded plaques.

The compositions of the present invention can be readily molded or formed into various kinds of useful articles by using any conventional molding, injection molding, blow molding, pressure forming, rotational molding and the like. Examples of the articles are sheets, films, foamed products as well as injection-molded articles, blow-molded articles, pressure-formed articles and rotational-molded articles having various kinds of shapes. These articles can be used in the fields of, for example, automobile parts, electrical parts, mechanical parts, foot wear, packaging materials, building materials and the like.

To assist those skilled in the art in the practice of this invention, the following Examples are set forth as illustrations. It is to be understood that in the specificiton and claims herein, unless otherwise indicated, when the amount of the polyamide or block copolymer is expressed in terms of percent by weight, it is meant percent by weight based on the total amount of these materials which is employed in the melt-blending. Furthermore, it is to be understood that, unless otherwise indicated, when the amount of carboxylic acid (—COOH) or carboxylate ion (—COO$^-$) is expressed in terms of percent by weight (% w), it is meant percent by weight based on the molecular weight of the corresponding base block copolymer.

EXAMPLE 1

Modified Block Copolymer

In this experiment, a modified block copolymer "C" was prepared utilizing the base block copolymer "A". A 5% (wt/wt) solution of Polymer A (see Table 1) in cyclohexane (3100 lb) was treated, in a closed vessel under nitrogen, with the metalation promoter, N,N,N',N'-tetramethylethylenediamine (TMEDA) (14 lb, 55 mol) and a titration indicator, 1,1-diphenylethylene (21 g, 0.1 mol). This solution was heated with stirring to 50° C. and titrated with s-butyllithium solution to remove impurities. At the endpoint of the titration, a slight excess of s-butyllithium reagent was reacted with the indicator forming a benzylic anion which gave the solution a yellow/orange color; the persistence of this color was taken as an indication that the solution was now anhydrous and anaerobic. These conditions were maintained throughout the rest of the experiment.

The metalation reagent, s-butyllithium (41 lb of a 12% (wt/wt) solution in cyclohexane, 35 mol), was added to the reaction mixture over a period of 15 minutes. The lithiated polymer cement was quite viscous and yellow in color. An aliquot of the cement was removed and treated with an excess of $D_2O$. This procedure placed a deuterium atom on the polymer at sites which had been lithiated. Analysis of the deuterted polymer using a Deuterium NMR technique found 89% of the deuterium was attached to the aromatic ring. Appropriate control experiments showed that the remainder of the deuterium label was at benzylic centers (about 5%) in the polystyrene segment and at allylic centers (about 6%) in the rubber of the polymer. These results showed that the polymer was lithiated principally in the styrene blocks (at least 94%).

After 1 hour in the lithiation reactor (60° C.), the cement was transferred to a closed vessel containing carbonated (142 lb of $CO_2$, 1500 mol) tetrahydrofuran (THF) (about 380 gal). The lithiated polymer cement was introduced below the surface of the $CO_2$/THF mixture. While carboxylation was likely instantaneous, the mixture was stirred at room temperature for 4 hr. The reactor product was acidified by the addition of 26 lbs. of acetic acid (200 mol). Modified block copolymer C was recovered by steam coagulation and dried at 50°-60° C. in a vacuum oven.

To measure the polymer bound carboxylic acid (—COOH) content of Polymer C, an aliquot of the finished polymer was dissolved in THF and titrated to a phenolphthalein endpoint using 0.01N KOH in methanol. The titration found 1.15% wt —COOH.

To determine the total carboxylate content, both —COO$^-$ and —COOH moieties of Polymer C, an aliquot of the finished polymer was dissolved in cyclohexane at a 10% solids level and treated with an equal volume of acetic acid. Control experiments had shown that the acid treatment converted polymer bound —COO$^-$ to —COOH species. The acidified mixture was repeatedly washed with $H_2O$ until the wash sample was neutral to remove excess acetic acid and acetate salts. The fully acidified polymer was precipitated in isopropanol, dried and titrated as outlined above. The titration found 1.15% wt —COOH; the same result as had been observed for the as finished polymer. By difference, we concluded that the as finished product, Polymer C, contained no carboxylate salt; Polymer C was in the all acid form —COOH.

An infrared analysis based upon characteristic IR bands for the —COOH species (1690 cm$^{-1}$) and polystyrene (1590 cm$^{-1}$) (in essence an internal standard signal) corroborated the titration results. The IR data were from a solution cast film of Polymer C.

Polymers D and L (see Table 2) were prepared using a modification of the procedure described for the preparation of Polymer C. Polymers D and L were prepared on a 5 lb. scale. Polymer L used Polymer B as a starting material. These preparations employed an increased amount of the metalation reagent (promoter) relative to the amount of polymer substrate. This led to products having higher carboxylate contents.

TABLE 2

| Modified Block Copolymer | Base Block Copolymer | Carboxyl functionality (% w-COOH) | Ratio of Carboxyl Groups to Alkenyl Arene Units in Base Block Copolymer | Carboxyl Groups per Molecule of Block Copolymer |
|---|---|---|---|---|
| C | A | 1.15 | 1:12 | 13.2 |
| D | A | 3.15 | 1:4.3 | 36.0 |
| L | B | 2.76 | 1:4.7 | 42.9 |

EXAMPLE 2

Neutralized Modified Block Copolymers

In this example, modified block copolymers were neutralized utilizing monovalent metal counterions, such as sodium ($Na^{1+}$) and lithium ($Li^{1+}$), and divalent metal counterions, such as magnesium ($Mg^{2+}$) and zinc ($Zn^{2+}$). The modified block copolymers were obtained by adding aqueous sodium hydroxide, lithium hydroxide and zinc acetate solutions in THF, respectively, to the modified block copolymer (all acid). The modified block copolymers neutralized utilizing magnesium metal counterions were obtained by neutralizing the respective modified block copolymer (all acid) with magnesium methoxide in anhydrous methanol. For those neutralized modified block copolymers having a metal carboxylate salt content greater than 80% based on total carboxyl groups, an excess of the metal carrying compound was utilized (typically five times stoichiometric) to ensure the high degree of neutralization.

Table 3 indicates the various neutralized block copolymers produced from the corresponding modified block copolymers for purposes of the following examples.

TABLE 3

| Modified Block Copolymer | Carboxyl functionality (% w) | Counterion | % Carboxyl Groups Neutralized |
|---|---|---|---|
| C | 1.15 | H | -0- |
| F1 | 1.15 | Na | 92 |
| G1 | 1.15 | Mg | 97 |
| H1 | 1.15 | Li | 45 |
| H2 | 1.15 | Li | 80 |
| H3 | 1.15 | Li | 95 |
| H4 | 1.15 | Li | 50 |
| J1 | 1.15 | Zn | >90 |
| D | 3.2 | H | -0- |
| K1 | 3.2 | Li | 67 |
| K2 | 3.2 | Li | >90 |
| L | 2.76 | H | -0- |
| M1 | 2.76 | Li | 65 |

EXAMPLE 3

Effect of Degree of Neutralization of Polystyrene Tg

In this example, the glass transition temperatures (Tg) of the polystyrene and poly(ethylene/butylene) phases of solution cast films of the base block copolymer "A" (control), and the carboxylated block copolymer having 1.15% w carboxyl functionality and a ratio of acid to lithium carboxylate salt of 100:0 (C), 55:45 (H1), and 5:95 (H3) were measured.

As is readily apparent from Table 4, carboxylation of the base block copolymer significantly increases the Tg of the polystyrene phase (S) without affecting the Tg of the poly(ethylene/butylene) phase (EB). Furthermore, as the degree of neutralization (carboxylate salt content) is increased, there is a corresponding increase in the Tg of the polystyrene phase. The increase in the Tg of the polystyrene phase is attributed to the existence of ion pair associations (ionic crosslinking). Incorporating a metal counterion increases the strength of these ion pair associations, further hindering molecular motion within the polystyrene phase.

TABLE 4

| Sample | Metal Counterion | Tg,E/B °C. | Tg,S °C. |
|---|---|---|---|
| Control | — | −42 | 97 |
| C | — | −42 | 120 |
| H1 | Li | −42 | 129 |
| H3 | Li | −42 | 135 |

EXAMPLE 4

Effect of Degree of Functionality of Polystyrene Tg

In this example, the glass transition temperatures (Tg) of the polystyrene and poly(ethyl/butylene) phases of additional solution cast films were measured. These films were of the base block copolymer "A" (control), and the carboxylated block copolymers having carboxyl functionality of 1.15% w (C) and 3.15% w (D), plus their lithium carboxylate salt counterparts (H3 and K2, respectively).

As is readily apparent from Table 5, the Tg of the polystyrene phase is enhanced by increasing the level of carboxyl functionality (see C and F). As earlier noted, the Tg of the polystyrene phase is also increased by increasing the metal carboxylate salt content at a fixed carboxyl functionality level. Table 5 also verifies the latter effect with respect to differing levels of carboxyl functionality (see C versus H3 and F versus K2). Thus, the effects of the level of carboxyl functionality and the metal carboxylate salt content compliment each other in correspondingly enhancing the Tg of the polystyrene as either or both of these quantities are increased. In the all acid form (—COOH), the ion pair interactions involving the hydrogen counterions with the polystyrene (alkenyl arene) phase are favored as the number of carboxyl functional groups is increased, thereby hindering chain mobility. As the hydrogen counterions are replaced with metal counterions via neutralization of the carboxyic acid moieties, the ion pair associations are promoted to a greater degree resulting in a corresponding enhancement in the Tg of the polystyrene phase.

TABLE 5

| Sample | Carboxyl Functionality (% w) | Metal Counterion | % Carboxyl Groups Neutralized | Polystyrene Tg (°C.) |
|---|---|---|---|---|
| A (control) | — | — | — | 102 |
| C | 1.15 | H | 0 | 125 |
| H3 | 1.15 | Li | 95 | 145 |
| F | 3.25 | H | 0 | 160 |
| K2 | 3.25 | Li | >90 | >250 |

EXAMPLE 5

Effect of Counterion on Polystyrene Tg

In this example, the glass transition temperatures (Tg) of the polystyrene phase of films cast from either THF or toluene or melt pressed films of the base block copolymer "A" (control), and the carboxylated block copolymer with 1.15% w carboxyl functionality having the counterions $H^{1+}$ (C), $Na^{1+}$ (F1), $Mg^{2+}$ (G1), $Li^{1+}$ (H3), and $Zn^{2+}$ (J1) were measured.

As earlier noted (Example 3) and as is also apparent in Tables 4 and 6, carboxylation of the base block copolymer significantly increases the Tg of the polystyrene blocks (S) without affecting the Tg of the poly(ethylene/butylene) block (EB). Furthermore, the Tg of the S block may be further increased by the neutralization of the all acid carboxylated block copolymer (C) with various metal counterions.

TABLE 6

| Sample | Metal Counterion | % Carboxyl Groups Neutralized | Tg, Polystyrene Block (°C.) Toluene Cast | Tg, Polystyrene Block (°C.) THF Cast | Tg, Polystyrene Block (°C.) Melt Pressed |
|---|---|---|---|---|---|
| A (Control) | — | — | 100 | 100 | 102 |
| C | — | 0 | 120 | 120 | 125 |
| F1 | Na | 92 | — | 140 | 140 |
| G1 | Mg | 97 | 125 | — | 135 |
| H3 | Li | 95 | 135 | 140 | 145 |
| J1 | Zn | >90 | — | 142 | 142 |

$Na^{1+}$ (F1), $Li^{1+}$ (H3), and $Zn^{2+}$ (J1) were measured at various temperatures.

Table 8 depicts the effect of different counterions on the tensile strength of the respective material as a function of temperature. The metal carboxylate salts possess superior high temperature properties over those of the all acid material and base block copolymer. Again, the opportunity presents itself with respect to tailoring the copolymer to the desired application by specifying a particular counterion and/or combination of counterions.

TABLE 8

| Sample | Metal Counterion | % Carboxyl Groups Neutralized | Tensile Strengths, (psi) R.T. | 70° C. | 100° C. | 150° C. | 200° C. |
|---|---|---|---|---|---|---|---|
| A (Control) | — | — | 5300 | 210 | 50 | — | — |
| C | — | 0 | 5800 | 1300 | 205 | 30 | — |
| F1 | Na | 92 | 6800 | — | 1700 | 300 | 60 |
| H3 | Li | 95 | 5900 | 3400 | 1200 | 250 | 70 |
| J1 | Zn | >90 | 5700 | 3200 | 1400 | 400 | 70 |

EXAMPLE 6

Effect of Degree of Neutralization on High Temperature Tensile Strengths

In this example, the tensile strengths of solution cast films of the base block copolymer "A" (control), and the carboxylated block polymer having a ratio of acid to lithium carboxylate salt at 100:0 (C), 55:45 (H1), and 5:95 (H3) were measured at various temperatures.

As is readily apparent from Table 7, carboxylation of the base block copolymer significantly increases the high temperature tensile strength of the material. Furthermore, these high temperature properties are further enhanced as the degree of neutralization (metal carboxylate salt content) is increased. Thus, by varying the degree of neutralization, the modified block copolymer may be tailored to the desired task.

These results demonstrate the necessity of promoting ion pair association in the alkenyl arene domains to enhance the mechanical performance of these block copolymers at elevated temperatures. Furthermore, the resulting restriction of molecular mobility in the alkenyl arene (polystyrene) domains correlates to tensile strength enhancement at elevated temperatures as evidenced by changes in the Tg of the polystyrene phase with respect to the presence of ion pair associations.

TABLE 7

| Temp (°C.) | Tensile Strengths, (psi) A (Control) | C | H1 | H3 |
|---|---|---|---|---|
| Room Temp | 5300 | 5800 | 5800 | 5900 |
| 70 | 210 | 1300 | 2500 | 3400 |
| 100 | 50 | 205 | 800 | 1200 |
| 150 | — | 30 | 80 | 250 |
| 200 | — | — | 15 | 70 |

EXAMPLE 7

Effect of Counterion on High temperature Tensile Strength

In this example, the tensile strengths of solution cast films of the base block copolymer "A" (control) and the modified block copolymer with 1.15% w carboxyl functionality (content) having the counterions $H^{1+}$ (C),

EXAMPLE 8

Effect of Degree of Functionality and Neutralization on High Temperature Tensile Strengths In this example, the tensile strengths of solution cast films of the base block copolymer "A" (control), modified block copolymers having 1.151 % w carboxyl functionality with a ratio of acid to lithium carboxylate salt at 100:0 (C) and 5:95 (H3) and modified block copolymers having 3.15% w carboxyl functionality with a ratio of acid to lithium carboxylate salt at 100:0 (D) and 33:67 (K1) were measured at various temperatures.

As is evident from Table 9, increasing the degree of carboxyl functionality results in a dramatic improvement in the tensile strength of the modified block copolymer at 100° C. Thus, by incorporating more ionic crosslinking species in the alkenyl arene segment, the mechanical integrity of the individual alkenyl arene domain is enhanced which translates into improved tensile properties at elevated temperatures. These results are consistent with the belief that selective functionalization of the alkenyl arene blocks with carboxyl functional groups promotes improved performance not previously achieved with other modified block copolymers.

As noted in Examples 6 and 7, the tensile strength of the modified block copolymer is also enhanced by increasing the metal carboxylate salt content at a fixed carboxyl functionality level. Table 9, also verifies this effect with respect to differing levels of carboxyl functionality (see C versus H3 and F versus K1(67% neutralization)). Thus the effects of the level of carboxyl functionality and the metal carboxylate salt content (neuturalization level) compliment each other in correspondingly enhancing the tensile strength of the modified block copolymer at elevated temperatures as either or both of these quantitites are increased. Furthermore, these results correlate well with the corresponding enhancement of the Tg of the polystyrene phase shown in Example 4.

TABLE 9

| Sample | Metal Counterion | Carboxyl Functionality (% w) | % Carboxyl Groups Neutralized | Tensile Strength (psi) Room Temp. | 100° C. |
|---|---|---|---|---|---|
| A (Control) | — | — | — | 5300 | 50 |
| C | — | 1.15 | 0 | 5800 | 205 |
| H3 | Li | 1.15 | 95 | 5900 | 1200 |
| F | H | 3.15 | 0 | 5600 | 1050 |
| K1 | Li | 3.15 | 67 | 5450 | 1200 |

EXAMPLE 9

Effect of Degree of Functionality and Neutralization on Compression Set

In this example, the degree of compression set of molded plaques of the base block copolymers "A" (control) and "B" (control) and various modified block copolymers derived therefrom were measured. The modified block copolymers utilized were the carboxylated (modified) block copolymer having 1.15% w carboxyl functionality with a ratio of acid to lithium carboxylate salt of 100:0 (C) and 20:80 (H2), and the carboxylated block copolymer having 2.67% w carboxyl functionality with a ratio of acid to lithium carboxylate salt of 35:65 (M1).

Table 10 summarizes the effect of the degree of carboxyl functionality and neutralization on the compression set of these modified block copolymers both at room temperature (R.T.) and elevated temperatures. The reported compression set values are the percent of unrecovered strain resulting from first subjecting the respective sample to an initial compressive strain of 25%; i.e., the sample is compressed to 75% of its initial height, for 22 hours at the indicated temperature and thereafter allowing a recovery period of 30 minutes during which the sample is not subjected to any strain.

As is readily apparent from Table 10, a distinct descrease in the unrecoverable strain (deformation) results with the addition of carboxyl functionality (see A versus H1). This result is most apparent at 70°0 C. and 100° C. This behavior is further enhanced when the polymer is neutralized with a metal conterion, for example lithium (see A and H1 versus H2). Moreover, increasing the degree of carboxyl functionality along with neutralization in the modified block copolymer drastically reduces the amount of permanent of permanent compressive deformation observed in the material at elevated temperatures (see L1).

These results suggest that ion pair associations in the polystyrene phase (alkenyl arene domains) contribute to increasing the resistance of the modified block copolymer to permanent deformation.

TABLE 10

| Sample | Carboxyl Functionality (% w) | Metal Counterion | % Carboxyl Groups Neutralized | % Compression Set R.T. | 70° C. | 100° C. |
|---|---|---|---|---|---|---|
| A (Control) | — | — | — | 20 | 95 | 100 |
| C | 1.15 | — | 0 | 35 | 65 | 85 |
| H2 | 1.15 | Li | 80 | 25 | 50 | 60 |
| B (Control) | — | — | — | 30 | 20 | 95 |

TABLE 10-continued

| Sample | Carboxyl Functionality (% w) | Metal Counterion | % Carboxyl Groups Neutralized | % Compression Set R.T. | 70° C. | 100° C. |
|---|---|---|---|---|---|---|
| M1 | 2.76 | Li | 65 | 25 | 30 | 20 |

EXAMPLE 10

Effect of Incorporating a Polar Thermoplastic Polymers on Blend Properties

In this example, the Shore D hardness and the compression set, tensile strength, and elongation at break at room temperature and various elevated temperatures were measured on solution cast samples A and C and on injection molded samples CB3, "01" and "02" formulated as shown in Table 11. The polar thermoplastic polymer utilized herein for exemplary purposes was a polyamide (nylon 6, CAPRON® 8200 from Allied Chemical). Similar improvements in these properties are expected if another polar thermoplastic polymer would be substituted for the polyamide utilized in the above-referenced formulations for samples "01" and "02". Samples A, C and CB3 are present for comparative purposes.

Blends of the polyamide with both the unmodified and modified block copolymer were prepared in a Haake 30 mm diameter corotating twin screw extruder. The blends were premixed by tumbling in polyethylene bags and then fed into the extruder. For the 60:40 block copolymer to polyamide formulations, the extruder melt temperature profile was about 215° C. in the feed zone, about 240° C. in the barrel, and about 230° C. at the die. For the 80:20 block copolymer to polyamide formulations, the extruder melt temperature profile was about 210° C. in the feed zone, about 270° C. in the barrel, and about 240° C. at the die. A screw speed of about 300 rpm was used. Injection molded test specimens were made from pelletized extrudate using an Arburg injection molder (Model number 221-5-250). Injection temperatures and pressures of about 230° C. to about 260° C. and about 1200 psig were utilized for the 60:40 formulations and of about 260° C. to about 300° C. and about 1500 psig were utilized for the 80:20 formulations, respectively, during the processing operations.

As is readily apparent from Table 11, the blends of the present invention have superior compression set, tensile strength and % retention, elongation at break and % retention at elevated temperature over blends incorporating the unmodified block copolyer ("01" versus CB3). Such improvements in compression set and elongation at break including % retention persist to higher ratios of block copolymer to polyamide. Additionally, at elevated temperatures (100° C. and 150° C.), there is significant improvement in tensile strength and % retention and elongation at break and % retention of the blends in the present invention ("01" and "02" versus CB3).

An additional observation is that sample CB3 delaminated upon failure of the test specimen during testing. The blends of the present invention did not experience delamination which is attributed to the improved adhesion between the phases therein.

TABLE 11

| Formulation (% w) | Sample[b] | | | | |
|---|---|---|---|---|---|
| | A | C | CB3 | 01 | 02 |
| Nylon 6 (Capron ® 8200) | | | 40 | 40 | 20 |
| Block Copolymer A | 100 | | 60 | | |
| Block Copolymer C (1.15% w-COOH) | | 100 | | 60 | 80 |
| TOTAL | 100 | 100 | 100 | 100 | 100 |
| Shore D Hardness | — | — | 53 | 51 | 35 |
| Compression Set, (%): | | | | | |
| 22 hours @ Room Temp. (23° C.) | 20 | 35 | 38 | 69 | 51 |
| 22 hours @ 70° C. | 95 | 65 | 93 | 81 | 78 |
| 22 hours @ 100° C. | 100 | 85 | 97 | — | — |
| Tensile Strength (psi)[a]: | | | | | |
| Room Temp. | 5300 | 5800 | 5500 | 4000 | 1440 |
| 70° C./% Retention | 210/4% | 1300/22% | 1057/19% | — | 375/26% |
| 100° C./% Retention | 50/1% | 205/4% | — | 1021/26% | 220/15% |
| 150° C./% Retention | — | 30/0.5% | — | 600/15% | 95/7% |
| Elongation at Break (%)[a]: | | | | | |
| Room Temp. | — | — | 350 | 300 | 300 |
| 70° C./% Retention | — | — | 104/30% | — | 130/43% |
| 100° C./% Retention | — | — | — | 172/57% | 95/31% |
| 150° C./% Retention | — | — | — | 129/43% | 30/10% |

[a] % Retention is with respect to corresponding room temperature property.
[b] Samples A, C, and CB3 are comparative samples (control).

EXAMPLE 11

Effect of Carboxyl Functional Group Graft Location

In this example, the sensitivity of a polar thermoplastic polymer blend composition to the graft location of the carboxyl functional group (i.e., grafting in the alkenyl arene block versus the selectively hydrogenated conjugated diene block) was evaluated. The composition was of a 60:40 ratio of a modified block copolymer to a polar thermoplastic polymer (polyamide: nylon 6, CAPRON ® 8200). The results are tabulated in Table 12.

Two types of modified block copolymers were utilized. One of these is the modified block copolymers utilized in the resent invention, i.e., grafted in the alkenyl arene blocks of the blockc copolymer. The other one was modified by grafting maleic anhydride to the conjugated diene block prepared as follows:

COMPARATIVE POLYMER 1 (CP1)

Maleic Anhydride Grafted

The base block copolymer "A" was extruder functionalized with 0.8% w bound maleic anhyride by the method disclosed in U.S. Pat. No. 4,578,429, wherein maleic anhydride is grafted to the selectively hydrogenated conjugated diene block of the copolymer "A" via a free radically initiated reaction. Unbound maleic anhydride was removed from this polymer by precipitating a cyclohexane solution of it into IPA. This maleic anhydride grafted polymer (CP1) was extruder blended with a polyamide (nylon 6; CAPRON ® 8200) according to the procedure disclosed herein at a 60:40 ratio of block copolymer to polyamide. Except for the low residual ethylenic unsaturation in the base block copolymer and the utilization of high shear extruders (twin screw) in both the grafting and blending stages, such blends are similar to those of Shiraki et al. (U.S. Pat. No. 4,657,970).

Comparison

As is readily apparent in Table 12, the graft location of the carboxyl functional group on the respective modified block copolymer has a dramatic and surprising effect on the mechanical properties of the respective polar thermoplastic polymer/modified block copolymer composition ("01" versus CB4). The compositions of the present invention which utilize a modified block copolymer with carboxyl groups grafted to the alkenyl arene blocks (see "01"), as opposed to grafted to the selectively hydrogenated conjugated diene blocks (see CB4), is superior in all properties measured, except for shore D hardness (both are comparable; 51 vs. 49, respectively) and compression set at room temperature. Additionally, similar improvements in these properties are expected if another polar thermoplastic polymer would be substituted for the polyamide utilized in the above-referenced formulation for samples "01" and CB4 and the comparison were repeated. As such, the compositions of the present invention are truly distinct, unique and surprisingly superior to compositions incorporating diene block functionalized block copolymers. However, it is within the scope of this invention that such diene block functionalized block copolymers may be utilized as a polar thermoplastic polymer herein.

TABLE 12

| Formulation (% w) | Sample[b] | |
|---|---|---|
| | CB4 | 01 |
| Nylon 6 (Capron ® 8200) | 40 | 40 |
| Block Copolymer CP1 (0.8% w maleic anhydride grafted) | 60 | |
| Block Copolymer C (1.15% w - COOH) | | 60 |
| TOTAL | 100 | 100 |
| Shore D Hardness | 49 | 51 |
| Compression Set, (%): | | |
| 22 hours @ Room Temp. (23° C.) | 26 | 69 |
| 22 hours @ 70° C. | 100 | 81 |
| 22 hours @ 100° C. | 100 | — |
| Tensile Strength (psi)[a]: | | |
| Room Temp. | 3600 | 4000 |
| 70° C./% Retention | 652/18% | — |
| 100° C./% Retention | — | 1021/21% |
| 150° C./% Retention | — | 600/15% |
| Elongation at Break (%)[a]: | | |
| Room Temp. | 240 | 300 |
| 70° C./% Retention | 63/26% | — |
| 100° C./% Retention | — | 172/57% |

TABLE 12-continued

| Formulation (% w) | Sample[b] | |
|---|---|---|
| | CB4 | 01 |
| 150° C./% Retention | — | 129/43% |

[a]% Retention is with respect to corresponding room temperature property.
[b]Sample CB4 is a comparative blend.

EXAMPLE 12

Effect of Grafting Carboxyl Group in Alkenyl Arene Block on Oil Resistance of Composition In this example, the oil resistance of a polar thermooplastic blend composition was evaluated with respect to incorporating an unmodified block copolymer (A) versus a modified block copolymer having carboxyl functional groups grafted in the alkenyl arene block (C) and also versus a modified block copolymer having carboxyl functional groups grafted in the selectively hydrogenated block (CP1). Tensile strengths and elongations at break were measured on injection molded test specimens after these test specimens had been immersed in ASTM #3 oil for a 7 day period.

As is readily apparent from Table 13, the composition of the present invention have significantly improved oil resistance over those utilizing either the unmodified polymer A or the modified polymer CP1 ("01" versus CB5 and CB6) or the unmodified polymer A alone and the modified polymer C alone. It is also apparent that the graft location of the carboxyl functional group has a dramatic effect on the mechanical properties of the composition ("01" versus CB4). For that matter, it is observed that grafting the carboxyl functional group in the diene block of the modified block copolymer effectively diminishes any oil resistance the composition had when an unmodified block copolymer is substituted therefor. (CB5 versus CB6). Such properties persist to higher block copolymer to polar polymer ratios ("02" versus "01").

Likewise, similar improvements in the oil resistance of these compositions are expected if another polar thermoplastic polymer would be substituted for the polyamide utilized in the above-referenced comparison.

reference should be made solely to the appended claims for purposes of determining the true scope of the present invention.

What is claimed is:

1. A multiphase thermoplastic composition comprising:
   (a) one phase containing at least one polar thermoplastic polymer each containing at least one polar functional group; and
   (b) at least one other phase containing at least one functionalized, selectively hydrogenated block copolymer to which has been grafted on the average an effective amount of carboxyl functional groups for imparting improved tensile strength, high temperature mechanical properties and oil resistance to said multiphase thermoplastic composition, said functionalized block copolymer comprising
      (1) a base block copolymer which comprises
         (i) at least one polymer block A, said A block being predominantly a polymerized alkenyl arene block, and
         (ii) at least one selectively hydrogenated polymer block B, said B block prior to hydrogenation being predominantly a polymerized conjugated diene block,
      (2) wherein substantially all of said carboxyl functional groups are grafted to said base block copolymer on said A blocks,
   (c) said one phase (a) being present in a weight ratio of about 1:99 up to less than about 50:50 relative to said at least one other phase (b), and
   (d) said polar thermoplastic polymer excluding said functionalized block copolymer.

2. The composition according to claim 1, wherein said carboxyl functional groups are carboxylic acids, their salts, their esters, and combinations of two or more of these.

3. The composition according to claim 1, wherein said effective amount of carboxyl functional groups is on the average at least about one (1) of said carboxyl functional groups per molecule of said functionalized block copolymer.

4. The composition according to claim 3, wherein said carboxyl functional groups are carboxylic acids.

TABLE 13

| | Samples[e] | | | | | |
|---|---|---|---|---|---|---|
| | A | C | CB5 | CB6 | 01 | 02 |
| Formulation (% w)[a]: | | | | | | |
| Nylon 6 (Capron ® 8200) | | | 40 | 40 | 40 | 20 |
| Block Copolymer A | 100 | | 60 | | | |
| Block Copolymer CP1 (0.8% mA) | | | | 60 | | |
| Block Copolymer C (1.15% w-COOH) | | 100 | | | 60 | 80 |
| TOTAL | 100 | 100 | 100 | 100 | 100 | 100 |
| Tensile Strength (psi)[b]: | | | | | | |
| Room Temp./% Retention | — | — | 1000/18% | c | 2218/56% | 220/15% |
| 60° C./% Retention | d | c | c | d | 1912/48% | — |
| Elongation at Break (%)[b]: | | | | | | |
| Room Temp./% Retention | — | — | 50/14% | c | 216/72% | 60/20% |
| 60° C./% Retention | d | c | c | c | 167/57% | — |

[a]Tested after immersing in ASTM #3 oil for 7 days.
[b]% Retention is with respect to corresponding unoiled room temperature property.
[c]Test specimen intact, but too soft to clamp and perform test.
[d]Test specimen was completely disintegrated (dissolved).
[e]Samples A, C, CB5, and CB6 are comparative samples.

While the present invention has been described and illustrated by reference to particular embodiments thereof, it will be appreciated by those of ordinary skill in the art that the same lends itself to variations not necessarily illustrated herein. For this reason, then, 5. The composition according to claim 3, wherein from 100 percent to 0 percent of said carboxyl functional groups are carboxylic acids and wherein correspondingly from 0 percent to 100 percent of said carboxyl functional groups are ionized by neutralization with metal ions having a positive ionized valence state forming metal carboxylate salts, said metal ions being selected from the group consisting of uncomplexed and complexed metal ions.

6. The composition according to claim 3, wherein a portion of said carboxyl functional groups are carboxylate salts or esters.

7. The composition according to claim 6, wherein said carboxylate salts are metal carboxylate salts of at least one metal selected from the group consisting of metals capable of forming metal ions having a positive valence state.

8. The composition according to claim 7, wherein said metal ions are selected from the group consisting of complexed and complexed metal ions.

9. The composition according to claim 1, wherein said functionalized block copolymer is characterized as having been prepared by the process which comprises metalating said base block copolymer, and
reacting the resulting metalated base block copolymer with effective amounts of at least one graftable electrophilic molecule containing at least one of said carboxyl functional groups or with effective amounts of an electrophile, wherein said electrophile is carbon dioxide, thereby preparing said functionalized block copolymer.

10. The composition according to claim 3, wherein said effective amount of carboxyl functional groups is on the average in an amount from
about one of said carboxyl functional groups per molecule of said functionalized block copolymer to about one of said carboxyl functional groups per aromatic ring of said A block.

11. The composition according to claim 1, wherein said polyamide is selected from the group consisting of straight chain and branched chain polyamides.

12. The composition according to claim 11, wherein said polyamide is selected from the group consisting of:
(a) a polyamide obtained by polymerizing a monoaminocarboxylic acid or an internal lactam thereof having at least two carbon atoms between the amino and carboxylic acid groups thereof,
(b) a polyamide obtained by polymerizing a diamine which contains at least two carbon atoms between the amino groups thereof and a dicarboxylic acid or ester thereof,
(c) a polyamide obtained by polymerizing a monoaminocarboxylic acid or an internal lactam thereof having at least two carbon atoms between the amino and carboxylic acid groups thereof together with a diamine which contains at least two carbon atoms between the amino groups thereof and a dicarboxylic acid or ester thereof, and
(d) mixtures of two or more of these.

13. The composition according to claim 12, wherein said polyamide is selected from the group consisting of polycaprolactam (nylon 6), polyhexamethylene adipamide (nylon 6,6), and copolymers of these.

14. The composition according to claim 1, wherein said polar thermoplastic polymers each contain at least one polar functional group selected from an amino group, hydroxyl group, thiol group, carboxyl group, isocyanate group, epoxy group and halogen group and groups derived therefrom.

15. The composition according to claim 14, wherein said polar thermoplastic polymers are polyamides.

16. The composition according to claim 14, wherein said polar thermoplastic polymers are thermoplastic polyesters.

17. The composition according to claim 14, wherein said polar thermoplastic polymers are thermoplastic polyurethanes.

18. The composition according to claim 14, wherein said polar thermoplastic polymers are polyvinyl alcohols.

19. The composition according to claim 14, wherein said polar thermoplastic polymers are polyvinyl esters.

20. The composition according to claim 14, wherein said polar thermoplastic polymers are ionomers of substrate copolymers of $\alpha,\beta$ unsaturated carboxylic acids and other monomers, said ionomers having carboxylic acid groups ionically crosslinked through at least one metal ion selected from the group consisting of monovalent, divalent and trivalent metal ions.

21. The composition according to claim 14, wherein said polar thermoplastic polymers are halogenated thermoplastics.

22. The composition according to claim 1, wherein said functionalized block copolymer has a branched structure.

23. The composition according to claim 1, wherein said functionalized block copolymer has a linear structure.

24. The composition according to claim 10, wherein
(a) each of said A blocks prior to hydrogenation is predominatly a polymerized monoalkenyl monocyclic arene block having an average molecular weight of about 1,000 to about 125,000,
(b) each of said B blocks prior to hydrogentation is predominantly a polymerized conjugated diene block having an average molecular weight of about 10,000 to about 450,000,
(c) said A blocks constituting about 1 to about 99 percent by weight of said base block copolymer,
(d) the residual ethylenic unsaturation of said B block is less than about 10 percent of the ethylenic unsaturation of said B blocks prior to hydrogenation, and
(e) the residual aromatic unsaturation of said A blocks is greater than about 50 percent of the aromatic unsaturation of said A block prior to hydrogenation.

25. The composition according to claim 24, wherein said A blocks constitute about 2 to about 60 percent by weight of said base block copolymer.

26. The composition according to claim 25, wherein said A blocks constitute about 2 to about 55 percent by weight of said base block copolymer.

27. The composition according to claim 26, wherein said A blocks constitute about 2 to about 40 percent by weight of said base block copolymer.

28. The composition according to claim 24, wherein said effective amount of carboxyl function groups is on the average in an amount from
about ten of said carboxyl functional groups per molecule of said copolymer to
about one of said carboxyl functional groups per aromatic ring of said A block.

29. The composition according to claim 28, wherein said effective amount of carboxyl functional groups is on the average in an amount from
about ten of said carboxyl functional groups per molecule of said copolymer to
about one of said carboxyl functional groups per every two aromatic rings of said A block.

30. The composition according to claim 29, wherein said effective amount of carboxyl functional groups is on the average in an amount from
about ten of said carboxyl functional groups per molecule of said copolymer to
about one of said carboxyl functional groups per every ten aromatic rings of said A block.

31. The composition according to claim 24, wherein prior to hydrogenation:
(a) said A block is polymerized styrene and
(b) said B block is selected from the group consisting of polymerized isoprene, polymerized butadiene, and polymerized isoprene and butadiene copolymer.

32. The composition according to claim 31, wherein said B block is polymerized butadiene block having a 1,2 content of between about 35 percent and about 55 percent.

33. The composition according to claim 32, wherein said polymerized butadiene block has an average molecular weight of between about 10,000 to about 150,000.

34. The composition according to claim 33, wherein the residual ethylenic unsaturation of said polymerized butadiene block is less than 5 percent of the ethylenic unsaturation present prior to hydrogenation.

35. The composition according to claim 34, wherein the residual ethylenic unsaturation of said polymerized butadiene block is at most 2 percent of the ethylenic unsaturation present prior to hydrogenation.

36. The composition according to claim 35, wherein on the average the aromatic unsaturation of said A blocks is greater than about 90 percent of the aromatic unsaturation of said A block prior to hydrogenation.

37. The composition according to claim 36, wherein said polymerized styrene block has an average molecular weight of about 1,000 and about 60,000.

38. The composition according to claim 37, wherein prior to functionalization said copolymer is a polystyrene-poly(ethylene/butylene)polystyrene block copolymer.

39. The composition according to claim 37, wherein prior to functionalization said copolymer is a polystyrene-poly(ethylene/butylene) diblock copolymer.

40. The composition according to claim 31, wherein said B block is a polymerized isoprene block.

41. The composition according to claim 40, wherein said polymerized ioprene block has an average molecular weight of between about 10,000 to about 150,000.

42. The composition according to claim 41, wherein the residual ethylenic unsaturation of said polymerized isoprene block is less than about 5 percent of the ethylenic unsaturation present prior to hydrogenation.

43. The composition according to claim 42, wherein the residual ethylenic unsaturation of said polymerized isoprene block is at most about 2 percent of the ethylenic unsaturation present prior to hydrogenation.

44. The composition according to claim 43, wherein on the average the aromatic unsaturation of said A blocks is greater than about 90 percent of the aromatic unsaturation of said A blocks prior to hydrogenation.

45. The composition according to claim 44, wherein prior to functionalization said block copolymer is a polystyrene-poly(ethylene/propylene)-polystyrene block copolymer.

46. The composition according to claim 44, wherein prior to functionalization said block copolymer is a polystyrene-poly(ethylene/propylene) diblock copolymer.

47. The composition according to claim 7, wherein said metal ions are selected from the group consisting of monovalent metal ions, divalent metal ions, trivlent metal ions and combinations thereof.

48. The composition according to claim 47, wherein said metal ions are selected from the group consisting of lithium ions, sodium ions, zinc ions and combinations thereof.

49. The composition according to claim 48, wherein said metal ions are lithium ions.

50. The composition according to claim 48, wherein said metal ions are sodium ions.

51. The composition according to claim 48, wherein said metal ions are zinc ions.

52. The composition according to claim 47, wherein at most about 95 percent of said carboxyl functional groups are ionized by neutralization with said metal ions.

53. The composition according to claim 52, wherein at most about 50 percent of said carboxyl functional groups are ionized by neutralization with said metal ions.

54. The composition according to claim 53, wherein at most about 10 percent of said carboxyl functional groups are ionized by neutralization with said metal ions.

55. The composition according to claim 49, wherein at most about 95 percent of said carboxyl functional groups are ionized by neutralization with said lithium ions.

56. The composition according to claim 1, wherein said one phase (a) being present in a weight ratio of about 5:95 up to about 45:55 relative to said at least one other phase (b).

57. The composition according to claim 56, wherein said one phase (a) being present in a weight ratio of about 20:80 up to about 40:60 relative to said at least one other phase (b).

* * * * *